US012092983B2

(12) United States Patent
Hanayama et al.

(10) Patent No.: US 12,092,983 B2
(45) Date of Patent: Sep. 17, 2024

(54) IMAGE FORMING APPARATUS

(71) Applicant: CANON KABUSHIKI KAISHA, Tokyo (JP)

(72) Inventors: Hiroki Hanayama, Kanagawa (JP); Hiroki Asano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/979,819

(22) Filed: Nov. 3, 2022

(65) Prior Publication Data

US 2023/0152745 A1 May 18, 2023

(30) Foreign Application Priority Data

Nov. 17, 2021 (JP) ................................ 2021-187247
Nov. 17, 2021 (JP) ................................ 2021-187248

(51) Int. Cl.
*G03G 15/08* (2006.01)
*G03G 15/00* (2006.01)

(52) U.S. Cl.
CPC ......... *G03G 15/80* (2013.01); *G03G 15/0808* (2013.01); *G03G 15/0812* (2013.01); *G03G 15/5004* (2013.01)

(58) Field of Classification Search
None
See application file for complete search history.

(56) References Cited

U.S. PATENT DOCUMENTS

| | | | | |
|---|---|---|---|---|
| 5,761,589 A * | 6/1998 | Kido | G03G 15/0812 | 399/284 |
| 11,137,698 B2 | 10/2021 | Kishi et al. | | |
| 2007/0248375 A1* | 10/2007 | Nakazawa | G03G 15/065 | 399/88 |
| 2015/0071663 A1* | 3/2015 | Yoshioka | G03G 15/065 | 399/50 |
| 2016/0252841 A1* | 9/2016 | Goto | G03G 15/0812 | 399/55 |
| 2020/0089162 A1* | 3/2020 | Yoshida | G03G 21/1867 | |
| 2020/0201202 A1* | 6/2020 | Miura | G03G 15/0225 | |
| 2021/0296997 A1* | 9/2021 | Hosokawa | B41J 29/393 | |
| 2021/0305900 A1* | 9/2021 | Hosokawa | G03G 15/80 | |

FOREIGN PATENT DOCUMENTS

| | | |
|---|---|---|
| JP | 2005-345532 A | 12/2005 |
| JP | 2014-238490 A | 12/2014 |
| JP | 2016-126247 A | 7/2016 |
| JP | 2018-013720 A | 1/2018 |
| JP | 2020-187192 A | 11/2020 |
| WO | WO-2021200464 A1 * | 10/2021 |

* cited by examiner

*Primary Examiner* — Sevan A Aydin
(74) *Attorney, Agent, or Firm* — Venable LLP

(57) ABSTRACT

An image forming apparatus includes a photosensitive member, a charging member, a developing member, a contacting member contacting the developing member, and first to third power sources. The first power source generates a first voltage and applies it to the charging member. The second power source generates a second voltage, lower than the first voltage, from the first voltage and applies it to the contacting member. The third power source generates a third voltage, lower than the second voltage, from the second voltage and applies it to the developing member.

14 Claims, 11 Drawing Sheets

IMAGE FORMING APPARATUS

FIELD OF THE INVENTION AND RELATED ART

The present invention relates to an image forming apparatus, for example, an image forming apparatus using the electrophotographic method.

In the past, configurations have been proposed that generate multiple voltages from a single high-voltage circuit to achieve cost reduction. For example, in the Japanese Laid-Open Patent Application No. 2014-238490, a charging voltage is generated by a transformer, and a developing voltage is generated by dividing the charging voltage with a resistor and a switching element. Here, the charging voltage is applied to a charging roller, and the developing voltage is applied to a developing roller. Also, for example, in the Japanese Laid-Open Patent Application No. 2018-013720, a blade voltage is generated by a transformer, and a developing voltage is generated by dividing the blade voltage with a Zener diode and a resistor. Here, the blade voltage is applied to a developing blade.

The developing blade is a blade that contacts and slides on the developing roller to even out the toner on the surface of the developing roller.

Here, the Japanese Laid-Open Patent Application No. 2014-238490 describes generating the developing voltage from the charging voltage, but there is no description of the developing blade. Also, the Japanese Laid-Open Patent Application No. 2018-013720 describes generating the developing voltage from the blade voltage, but the charging voltage is generated by a separate power supply circuit.

According to the configurations in the Japanese Laid-Open Patent Application No. 2014-238490 and the Japanese Laid-Open Patent Application No. 2018-013720, the cost of the circuits can be reduced by sharing some of the circuits that generate the voltages to be applied to each process member. The conventional circuit configuration was sufficient to meet the cost requirements desired at the time, but further cost reductions are being sought in recent years.

Furthermore, in a configuration where multiple voltages are generated from one high-voltage circuit by voltage divider control, the following issues arise. If a voltage is output from one high-voltage circuit and the voltage connected below that voltage is controlled not to be output, the load on the transformer that generates the high voltage becomes excessive for a normal execution of the electrophotographic process. In other words, the required capacity of the transformer becomes excessive, leading to higher cost and size increase of the transformer.

Therefore, an inexpensive circuit configuration is in demand to suppress image defects caused by contact portions between the members involved in the development process.

The purpose of the present invention is to suppress image defects caused by contact portions between members involved in the development process with an inexpensive circuit configuration.

SUMMARY OF THE INVENTION

In order to solve the aforementioned issues, the present invention has the following configuration: an image forming apparatus comprising: a photosensitive member; a charging member configured to charge the photosensitive member; a developing member configured to develop an electrostatic latent image formed on the photosensitive member and to form a toner image on the photosensitive member; a first contacting member contacting the developing member; a first power source configured to generate a first voltage and to apply the first voltage to the charging member; a second power source configured to generate a second voltage lower than the first voltage from the first voltage generated by the first power source and to apply the second voltage to the first contacting member; and a third power source configured to generate a third voltage lower than the second voltage from the second voltage generated by the second power source and to apply the third voltage to the developing member.

Furthermore, the present invention has the following configuration: an image forming apparatus comprising: a photosensitive member; a developing member movable between a contacting position where the developing member contacts the photosensitive member and a separating position where the developing member separates from the photosensitive member, and configured to develop an electrostatic latent image formed on the photosensitive member with a toner in the contacting position; a first contacting member contacting the developing member in a state in which the developing member is positioned in the contacting position and in the separating position; a first power source including a transformer and configured to generate a first voltage; a second power source configured to generate a second voltage, from the first voltage, and to apply the second voltage to the developing member; a third power source configured to generate a third voltage from the second voltage generated by the second power source and to apply the third voltage to the first contacting member; and a controller configured to, when a potential difference between the second voltage and the third voltage is a first potential difference and a potential difference larger than the first potential difference is a second potential difference, control to form the first potential difference in the separating state and to form the second potential difference in the contacting state, wherein the controller controls so that an absolute value of the second voltage in the separating state becomes larger than the absolute value of the second voltage in the contacting state.

Further features of the present invention will become apparent from the following description of exemplary embodiments with reference to the attached drawings.

DESCRIPTION OF THE EMBODIMENTS

The following is a detailed description of the embodiments of the present invention with reference to the drawings.

Embodiment 1

(Configuration of the Image Forming Apparatus)

Figure 1:
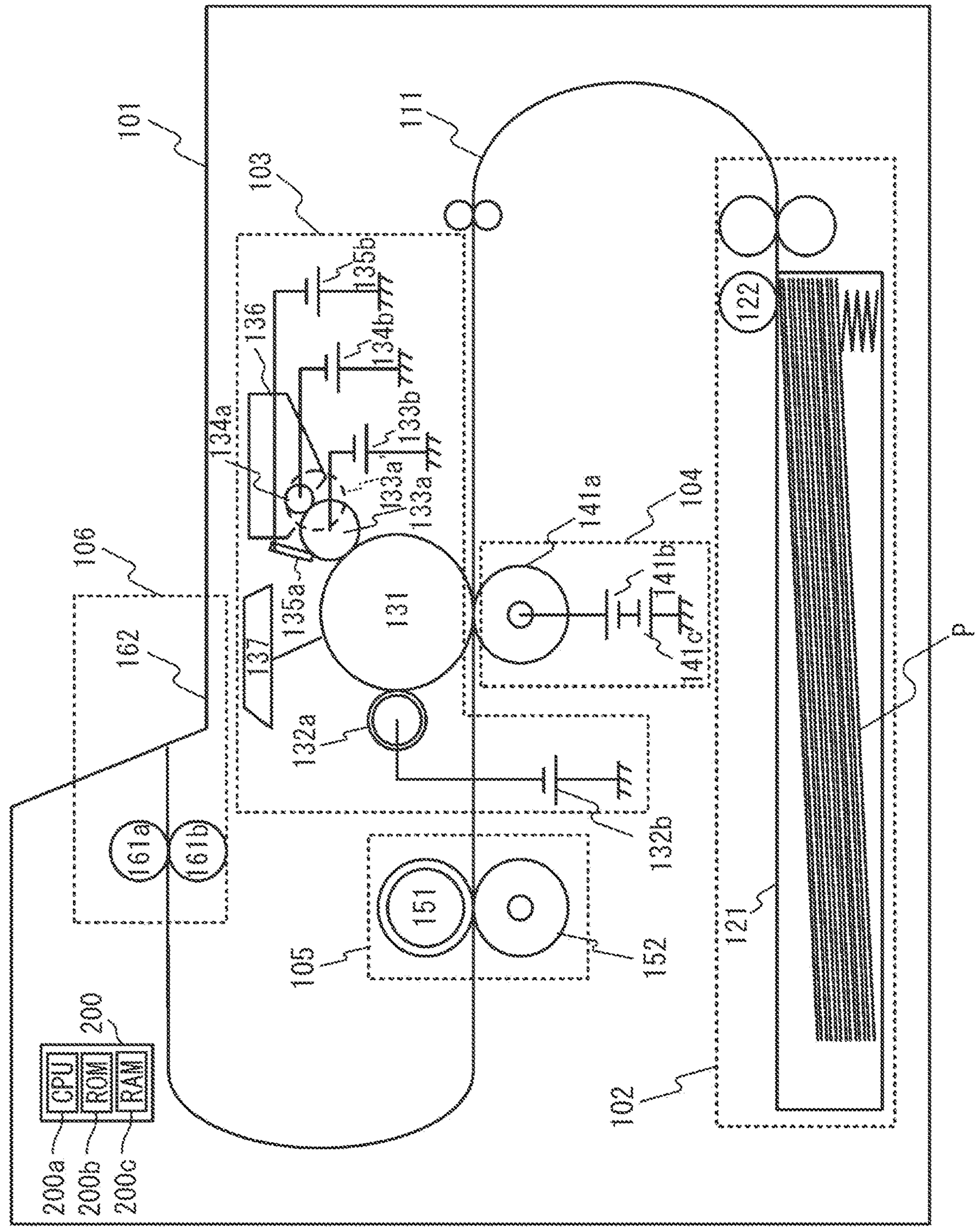
FIG. 1 is a schematic cross-sectional drawing of the image forming apparatus of Embodiment 1 and Embodiment 2.

FIG. 1 is a schematic cross-sectional drawing of an image forming apparatus 101. A paper feeding portion 102 has a paper feeding tray 121 and a paper feeding roller 122, and paper P to be printed on is stored in the paper feeding tray 121. An image forming portion 103 has a photosensitive drum 131 as a photosensitive member, a charging roller 132*a* as a charging member, a developing roller 133*a* as a developing member, a toner supplying roller 134*a* as a second contacting member (supplying roller), and a developing blade 135*a* as a first contacting member (blade). The image forming portion 103 also has a toner container 136 and a laser scanner 137, etc. The first power source, a charging circuit 132*b*, applies a generated high voltage to the charging roller 132*a*. The third power source, a developing circuit 133*b*, applies a generated high voltage to the developing roller 133*a*. The fourth power source, a toner supplying R circuit 134*b*, applies a generated high voltage to the toner supplying roller 134*a*. The second power source, a blade circuit 135*b*, applies a generated high voltage to the developing blade 135*a*.

A transfer portion 104 has a transfer roller 141*a*. A transfer negative circuit 141*c* connected serially to a transfer positive circuit 141*b* and a transfer positive circuit 141*b* applies a generated high voltage to the transfer roller 141*a*. Here, the transfer negative circuit 141*c* may be connected in parallel with the transfer positive circuit 141*b* and its connection to the transfer roller 141*a* may be switched by a switch or other switching means, or the transfer negative circuit 141*c* itself may be eliminated. The transfer roller 141*a* is in contact with the photosensitive drum 131. A fixing portion 105 has a fixing roller 151 and a pressure roller 152. A discharge portion 106 includes discharge rollers 161*a* and 161*b* and a discharge tray 162.

A control portion 200, which is a control means, has a CPU 200*a*, a ROM 200*b*, and a RAM 200*c*. The CPU 200*a* controls the image forming operation by the image forming portion 103, the fixing operation by the fixing portion 105, the feeding operation of a sheet P, and other operations according to various programs stored in the ROM 200*b*, while using the RAM 200*c* as a work area. The control portion 200 also controls the contacting or separating movement of the developing roller 133*a*, which is described below, and each circuit, which is each power source that applies each voltage, which is described below. A control portion that controls the image forming portion 103, the fixing portion 105, and each power source may be provided separately from the control portion 200, and the control portion 200 may be configured to control the separately provided control portion.

(Operation of the Image Forming Apparatus)

The operation of the image forming portion 103 forming a toner image on the surface of the photosensitive drum 131 is described below. The charging roller 132*a*, to which a negative high voltage is applied from the charging circuit 132*b*, charges the surface of the photosensitive drum 131. The charging process in Embodiment 1 uses, for example, a roller charging method. The charging roller 132*a* faces the photosensitive drum 131 with a small air gap (GAP), and the charging roller 132*a* charges the surface of the photosensitive drum 131 using electric discharge in the air gap. A laser scanner 137 irradiates a laser beam onto the photosensitive drum 131 according to image data to form a latent image on the surface of the photosensitive drum 131. The toner contained (stored) in the toner container 136 is charged to negative polarity, for example, by agitation.

The toner supplying roller 134*a* supplies toner stored in the toner container 136 to the developing roller 133*a*. The toner is moved to the surface of the developing roller 133*a* by the toner supplying roller 134*a*, to which a negative high voltage is applied from the toner supplying R circuit 134*b*, and adheres to the surface. The developing blade 135*a* evens out the toner supplied to the developing roller 133*a* by the toner supplying roller 134*a*. Since the toner adhering to the surface of the developing roller 133*a* is uneven in height from place to place, it is uniformly evened out by the developing blade 135*a* to which a negative high voltage is applied by the blade circuit 135*b*. The developing roller 133*a*, with toner adhered to its surface, uses the negative high voltage applied from the developing circuit 133*b* to move the toner to the surface of the photosensitive drum 131, where an electrostatic latent image is developed. Here, the output voltage of the toner supplying R circuit 134*b* is set so that its absolute value is larger than that of the developing circuit 133*b*, making it easier to move the negatively charged toner to the developing roller 133*a*. The output voltage of the blade circuit 135*b* is set so that its absolute value is larger than the output voltage of the developing circuit 133*b*, making it difficult for negatively charged toner to stick to the developing blade 135*a*. For example, the output voltage of the developing circuit 133*b* is set to −300 V, and the output voltage of the toner supply R circuit 134*b* and the blade circuit 135*b* is set to −500 V.

The operation of image formation on a paper P is described next. When the image forming apparatus 101 receives a print job, each roller and the laser scanner 137 begin operating. The paper P stored in the paper feeding tray 121 is fed by the paper feeding roller 122, is fed through a feeding path 111, and eventually reaches a position where the photosensitive drum 131 and the transfer roller 141*a* are facing each other. The paper P is held between the photosensitive drum 131 and the transfer roller 141*a* (hereinafter referred to as "nip"), to which a positive high voltage is applied from the transfer positive circuit 141*b*, during which the toner image formed on the surface of the photosensitive drum 131 is transferred onto the paper P. The paper P, which continues to be fed, next reaches the fixing portion 105, where it is pressure nipped by a fixing roller 151 and a pressure roller 152, and the toner image that was not yet fixed on the paper P is fixed. Thereafter, the paper P is ejected to the discharge tray 162 via the discharge rollers 161*a* and 161*b*.

(Developing Separation Mechanism)

Next, the configuration of separating the developing roller 133*a* from the photosensitive drum 131 is explained. Since the developing roller 133*a* rotates while sliding against the photosensitive drum 131, the toner supplying roller 134*a*, and the developing blade 135*a*, the surface wears and deteriorates over time. Considering the product life of the image forming apparatus 101, the time of sliding should be minimized. The image forming apparatus 101 of Embodiment 1 is equipped with a developing separation mechanism (see FIG. 2), which is a contacting/separating portion that can separate the developing roller 133*a* from the photosensitive drum 131. The developing roller 133*a* can be in contact with the photosensitive drum 131 or separated from the photosensitive drum 131, and when in contact, the electrostatic latent image formed on the photosensitive drum 131 (on the photosensitive member) is developed with toner to form a toner image.

The developing separation mechanism switches the developing roller 133*a* from a separated state, where it is separated from the photosensitive drum 131, to a contacting state, where it is in contact with it, by moving the portion that includes the developing roller 133*a*, the toner supplying roller 134*a*, the developing blade 135*a*, and the toner container 136. In other words, the developing blade 135*a* is in contact with the developing roller 133*a* in the contacting and separated states, and the toner supplying roller 134*a* is also in contact with the developing roller 133*a* in the contacting and separated states. In FIG. 1, the state in which the developing roller 133*a* is separated is represented by the dashed line 133*a'*.

The image forming apparatus 101 has the developing separation mechanism, which switches the developing roller 133*a* into the contacting or separated state, which is a contacting/separating portion. In Embodiment 1, the developing separation mechanism includes a clutch driving circuit 250, a developing separation clutch 252, a developing separation gear 254, and a driving motor 256 (see FIG. 2). The control portion 200 controls the contacting and separating mechanism. The developing separation clutch 252 is driven via the clutch driving circuit 250. The developing separation clutch 252 can switch between a state in which the drive is transmitted from the driving motor 256 to the developing separation gear 254 (hereinafter referred to as the transmitted state) and a state in which the drive from the driving motor 256 to the developing separation gear 254 is shut off (hereinafter referred to as the shut-off state). The control portion 200 controls the driving motor 256 via a driving circuit (not shown) and a rotation sensing means such as an encoder (not shown). The control portion 200 controls the developing separation clutch 252 via the clutch driving circuit 250. In the transmitted state, the developing roller 133*a* is separated from the photosensitive drum 131, and in the shut-off state, the developing roller 133*a* is in contact with the photosensitive drum 131. The control portion 200 can switch the developing roller 133*a* to the contacting or separated state at a predetermined timing. An electromagnetic clutch can be used as the developing separation clutch 252. The transmitted (contacting) state and the shut-off state may be switched by using a chipped tooth gear and a solenoid as the developing separation clutch 252. As mentioned above, in Embodiment 1, when the developing roller 133*a* contacts or separates from the photosensitive drum 131, the toner supplying roller 134*a*, the developing blade 135*a*, and the toner container 136 also move in conjunction with the developing roller 133*a*.

The developing separation mechanism also has the function of disengaging (releasing) the rotating driving gear (not shown) of the developing roller 133*a* during the separation, so that the developing roller 133*a* and the toner supplying roller 134*a* stop rotating in the separated state. The image forming apparatus 101 controls the developing separation mechanism to the separated state when no image forming operation is being performed (hereinafter referred to as non-image forming timing). This improves durability by eliminating sliding between the developing roller 133*a* and the photosensitive drum 131, the toner supplying roller 134*a*, and the developing blade 135*a*.

(Configuration and Operation of the High-Voltage Generator Circuit)

Figure 2:
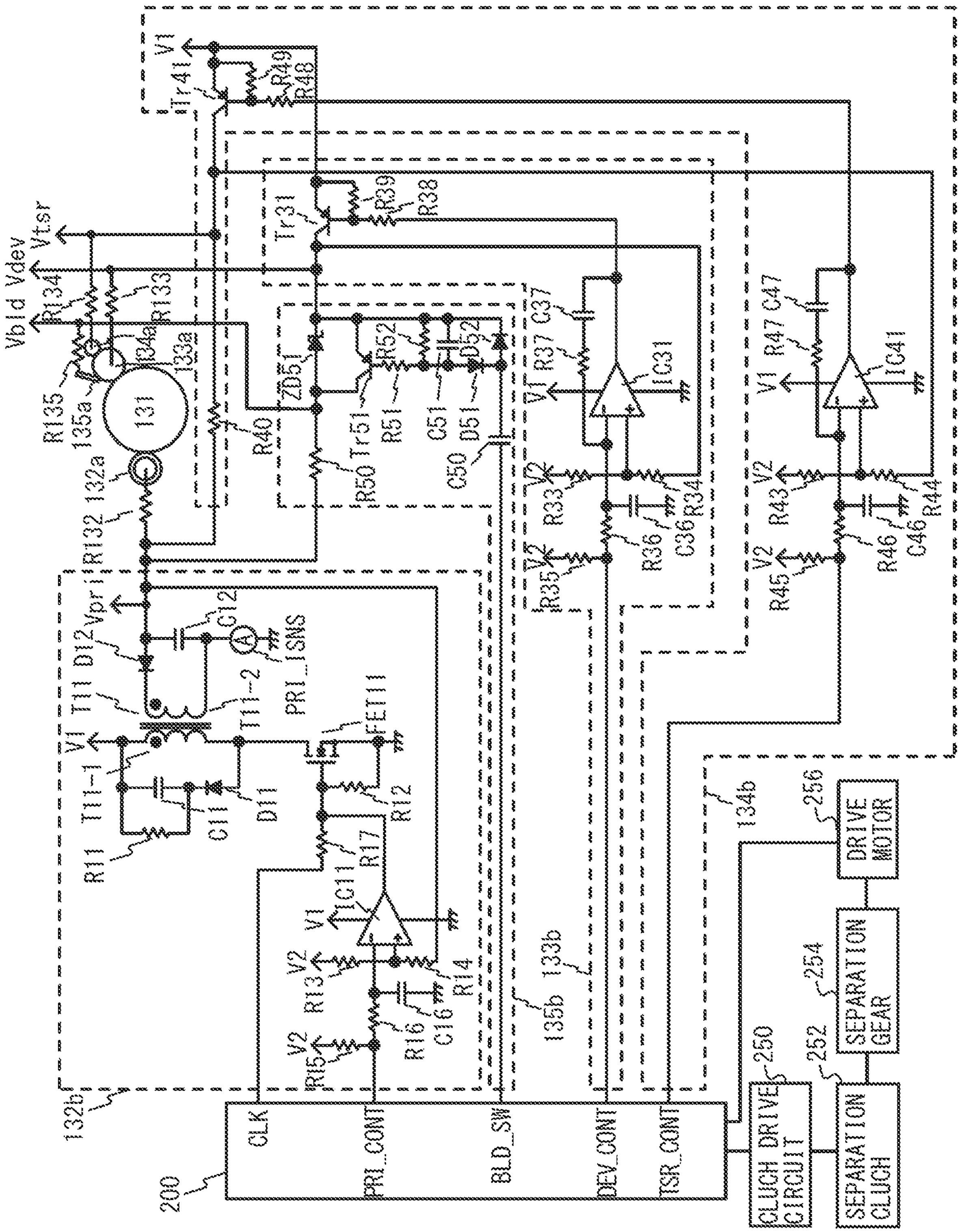
FIG. 2 is a circuit diagram of an image forming portion according to Embodiment 1.

The configuration and operation of the charging circuit 132*b*, developing circuit 133*b*, toner supply R circuit 134*b*, and blade circuit 135*b* in the image forming portion 103 are explained using FIG. 2.

(Charging Circuit)

A transformer T11 has a primary coil T11-1 and a secondary coil T11-2. A power source voltage V1 is connected to one terminal of the primary coil T11-1, and a field-effect transistor (hereinafter referred to as FET) 11 is connected to the other terminal. The black circles on a primary coil T11-1 and a secondary coil T11-2 indicate the beginning of the coil winding (in other words, the polarity). A resistor R12 is connected to the gate terminal of the FET 11 with the source terminal, and a resistor R17 is connected to a CLK terminal of the control portion 200. Between one terminal of the primary coil T11-1 and the other terminal (hereinafter referred to as "in-between both terminals"), a parallel circuit consisting of a capacitor C11 and a resistor R11 connected in parallel, and a diode D11 are further connected in series. The diode D11 has its cathode terminal connected to the parallel circuit of the capacitor C11 and the resistor R11, and its anode terminal connected to the other terminal of the primary coil T11-1 and the drain terminal of the FET11.

On the other hand, a diode D12 and a capacitor C12 are connected between both terminals of the secondary coil T11-2. The diode D12 has its cathode terminal connected to one terminal of the secondary coil T11-2 of the transformer T11 and its anode terminal connected to one terminal of the capacitor C12. The other terminal of the capacitor C12 is connected to a charging current detection circuit PRI_ISNS, which is a detection means. The power source voltage V1 in Embodiment 1 is, for example, 24 V.

The control portion 200 outputs a high-level or low-level signal from the CLK terminal. When a signal in the high-level state is output from the CLK terminal, the FET11 turns on and the drain voltage of the FET 11 drops to almost the same potential as the ground (hereinafter referred to as "GND"). As a result, voltage is applied to both ends of the primary coil T11-1 of transformer T11, and an excitation current flows. In this state, when the voltage output from the CLK terminal changes to the low-level state, the FET 11 turns off and a flyback voltage is generated at both ends of the primary coil T11-1. At the same time, a flyback voltage is generated in the secondary coil T11-2 in proportion to the winding ratio between the primary coil T11-1 and the secondary coil T11-2. The generated flyback voltage is rectified and smoothed by the diode D12 and the capacitor C12 to generate the first voltage of negative polarity, the charging voltage Vpri. The capacitor C11, resistor R11, and diode D11 serve as a snubber circuit that absorbs the surge voltage due to the leakage inductance of the primary coil T11-1.

The voltage output from the CLK terminal of the control portion 200 is a square wave that alternates between high-level and low-level states. In Embodiment 1, for example, a fixed square wave with a frequency of 50 kHz and a duty of 10% is output. Here, the duty of 10% is the percentage of the high-level time out of one signal cycle (sum of the high-level time and low-level time), but it can also be the percentage of the low-level time. The frequency and duty cycle of the square wave should be designed to the optimum value for each circuit and are not limited to the values in Embodiment 1. Furthermore, the frequency and duty cycle of the square wave need not be fixed but may be variable depending on the voltage and load to be controlled. When the FET 11 is turned on and off, the flyback voltage generated in the secondary coil T11-2 is rectified and smoothed by the diode D12 and capacitor C12 to generate the charging voltage Vpri.

The charging circuit 132*b* provides feedback control of the charging voltage Vpri in order to control the charging voltage Vpri to a stable and predetermined voltage.

The charging voltage Vpri is connected to the power source voltage V2 through resistors R14 and R13. The connection point between the resistor R14 and the resistor R13 is connected to the positive input terminal (non-inverted input terminal, + terminal) of the comparator IC11. The negative input terminal (inverted input terminal, − terminal) of the comparator IC11 is connected to the power source voltage V2 via resistor R16 and resistor R15, and is also connected to GND via a capacitor C16. The connection point of the resistor R15 and the resistor R16 is connected to the PRI_CONT terminal of the control portion 200. The output terminal of the comparator IC11 is connected to the gate terminal of the FET11. The PRI_CONT terminal outputs a pulse signal that alternates between a high impedance (hereinafter referred to as Hi-Z) state and a low-level state.

When the PRI_CONT terminal is in the Hi-Z state, a current flows from the power source voltage V2 to charge the capacitor C16 through the resistors R15 and R16. On the other hand, when the PRI_CONT terminal is in the low-level state, the current to discharge the capacitor C16 flows toward the PRI_CONT terminal through the resistor R16. When the PRI_CONT terminal repeats the Hi-Z state and the low-level state, the balance of charging and discharging of the capacitor C16 stabilizes at a predetermined voltage. Therefore, the voltage of the negative input terminal of the comparator IC11 is determined according to the duty of the pulse signal output from the PRI_CONT terminal.

Figure 3:
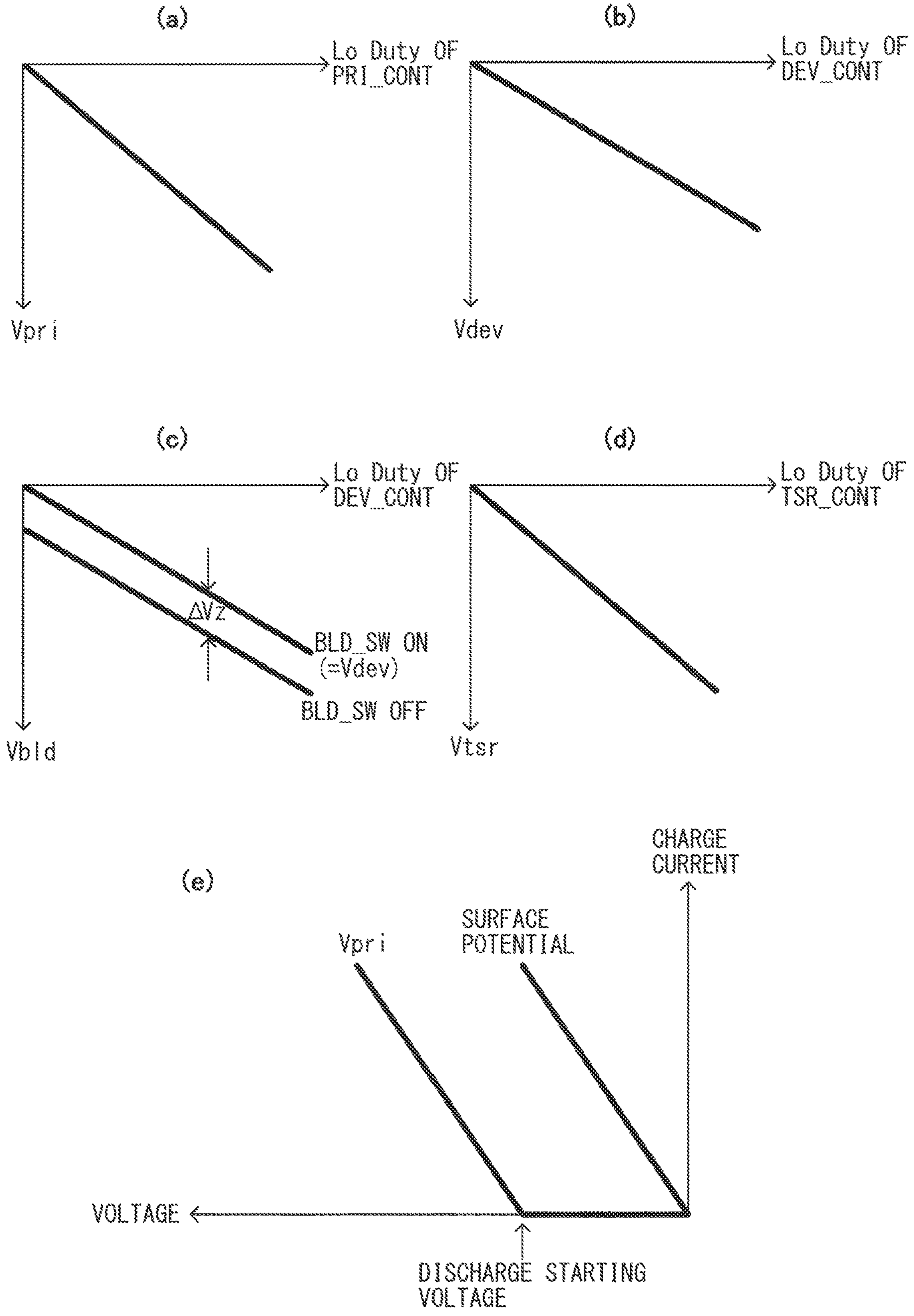
FIG. 3, part (a) to part (e), is a drawing showing the relationship between the settings of each circuit and the output voltage according to Embodiment 1, as well as the relationship between the potential of the photosensitive drum surface and the charging voltage and charging current.

Part (a) of FIG. 3 shows the relationship between the pulse signal output from the PRI_CONT terminal and the charging voltage Vpri, with the low duty (Lo Duty) of the pulse signal output from the PRI_CONT terminal on the horizontal axis and the charging voltage Vpri on the vertical axis. Specifically, as shown in part (a) of FIG. 3, the larger the low duty of the pulse signal output from the PRI_CONT terminal, the larger the absolute value of the charging voltage Vpri, which is a negative voltage.

Let us return to the explanation of FIG. 2. If the voltage at the negative input terminal of the comparator IC11 is less than the positive input terminal, the output terminal of the comparator IC11 is Hi-Z. In this case, the signal output from the CLK terminal of the control portion 200 is input directly to the gate terminal of the FET 11, driving the FET 11 on and off. On the other hand, when the voltage of the negative input terminal of the comparator IC11 is greater than the positive input terminal, the output terminal of the comparator IC11 becomes low level. At this time, the current output from the CLK terminal is drawn by the output terminal of the comparator IC11, forcing the gate voltage of the FET 11 to a low level. This prevents the FET 11 from turning on at the timing when it should turn on, thus prompting a decrease in the absolute value of the charging voltage Vpri. This operation makes it possible to control the charging voltage Vpri to a predetermined voltage. The control portion 200 performs feedback control of the charging voltage Vpri by controlling the low duty of the signal output from the PRI_CONT terminal. Here, Embodiment 1's power source voltage V2 is 5 V. Since the power source voltage V2 affects the voltages of the positive and negative input terminals of the comparator IC11, it should be noted that a power source with a relatively high voltage accuracy should be used for the power source voltage V2. The comparator IC11 is operated by the power source voltage V1.

Through the above operation, a stable charging voltage Vpri is generated by the charging circuit 132*b* and applied to the charging roller 132*a*. A resistor R132 is provided to limit the output current. Furthermore, the resistor R132 is also provided for the purpose of ESD (Electro Static Discharge) protection from external sources when the detachable charging roller 132*a* is removed from the image forming apparatus 101. The resistance R132 may be included as necessary. The value of the charging voltage Vpri in Embodiment 1 is −1500 V, for example.

(Charging Current Detection)

The charging current detection circuit PRI_ISNS is a circuit that detects the current supplied to the charging roller 132*a* (hereinafter referred to as charging current). A known method for accurately detecting the potential of the surface of the photosensitive drum 131 is to detect the voltage at which discharge from the charging roller 132*a* to the photosensitive drum 131 is initiated (hereinafter referred to as the discharge initiating voltage). The relationship between the charging voltage Vpri and the surface potential of the photosensitive drum 131 and the charging current is shown in part (e) of FIG. 3. Part (e) of FIG. 3 shows the voltage (negative) on the horizontal axis and the charging current on the vertical axis. Part (e) of FIG. 3 explains the transition between the charging current and the surface potential of the photosensitive drum 131 when the charging voltage Vpri is gradually increased in absolute value from 0 V. The charging voltage Vpri starts to increase from 0 V. and for a while, no charging current flows (OA). When the charging voltage Vpri reaches the discharge initiating voltage, discharge from the charging roller 132*a* to the photosensitive drum 131 starts, and the charging current begins to flow. The surface potential of the photosensitive drum 131 is 0 V at this point, and thereafter, it increases while maintaining the same potential difference from the charging voltage Vpri as the discharge initiating voltage (i.e., the lines of the graph remain parallel).

Therefore, if a discharge initiating voltage is detected, the surface potential of the photosensitive drum 131 can be accurately detected based on the charging voltage Vpri and the discharge initiating voltage. However, the charging current must be detected with the developing roller 133*a* separated from the photosensitive drum 131 because the discharge current from the charging roller 132*a* to the photosensitive drum 131 must be correctly detected. In other words, the control portion 200 controls the developing separation mechanism so that the developing roller 133*a* is in the separated state when the current flowing to the charging roller 132*a* is detected by the charging current detection circuit PRI_ISNS. In Embodiment 1, the charging current detection is performed with the developing separation mechanism controlled in the separated state during non-image forming control.

(Developing Circuit)

A developing circuit 133*b* is a circuit that generates a negative polarity third voltage, a developing voltage Vdev, by reducing the charging voltage Vpri by dividing the voltage. It is connected from the charging voltage Vpri to the power source voltage V1 via a resistor R50, a Zener diode ZD51, and a transistor Tr31. The developing circuit 133*b* outputs the voltage at a collector terminal of the transistor Tr31 as the developing voltage Vdev. A resistor R39 is connected between the base terminal of the transistor Tr31 and the emitter terminal, and a resistor R38 is connected to the output terminal of an operational amplifier IC31.

The developing circuit 133*b* also provides feedback control of the developing voltage Vdev in order to control the developing voltage Vdev to a stable and predetermined voltage. The developing voltage Vdev is connected to the power source voltage V2 through resistors R34 and R33. The connection point between the resistor R34 and the resistor R33 is connected to the positive input terminal of the operational amplifier IC31. The negative input terminal of the operational amplifier IC31 is connected to the power source voltage V2 via the resistors R36 and R35, and is also connected to the GND via the capacitor C36. The connection point between resistors R35 and R36 is connected to a DEV_CONT terminal of the control portion 200. A resistor R37 and a capacitor C37 are connected in series between the negative input terminal and the output terminal of the operational amplifier IC31. The resistor R37 and capacitor C37 are provided for phase compensation of the operational amplifier IC31 and contribute to the stability of feedback control. The operational amplifier IC31 is operated by the power source voltage V1.

The DEV_CONT terminal of the control portion 200 outputs a first pulse signal (hereinafter simply referred to as a pulse signal) that alternates between the Hi-Z state and the low-level state. When the pulse signal from the DEV_CONT terminal is in the Hi-Z state, a current flows from the power source voltage V2 through resistors R35 and R36 to charge the capacitor C36. On the other hand, when the pulse signal from the DEV_CONT terminal is in the low-level state, the current to discharge the capacitor C36 flows toward the DEV_CONT terminal through the resistor R36. When the DEV_CONT terminal repeats the Hi-Z state and the low-level state, the balance of charging and discharging of the capacitor C36 stabilizes at a predetermined voltage. Therefore, the voltage of the negative input terminal of the operational amplifier IC31 is determined according to the duty of the pulse signal output from the DEV_CONT terminal.

If the voltage at the negative input terminal of the operational amplifier IC31 is less than the positive input terminal, the output terminal of the operational amplifier IC31 becomes high-level. As a result, the transistor Tr31 is turned off and the absolute value of the developing voltage Vdev rises. On the other hand, if the voltage at the negative input terminal of the operational amplifier IC31 is greater than the positive input terminal, the output terminal of the operational amplifier IC31 becomes low-level. As a result, the transistor Tr31 is turned on and the absolute value of the developing voltage Vdev decreases. This operation makes it possible to control the developing voltage Vdev to a predetermined voltage. The control portion 200 controls the third power source, the developing circuit 133B, by outputting the first pulse signal. The control portion 200 performs feedback control of the developing voltage Vdev by controlling the low duty of the pulse signal output from the DEV_CONT terminal.

Part (b) of FIG. 3 shows the relationship between the pulse signal output from the DEV_CONT terminal and the developing voltage Vdev. The low duty (Lo Duty) of the pulse signal output from the DEV_CONT terminal is shown on the horizontal axis, and the developing voltage Vdev is shown on the vertical axis. As shown in part (b) of FIG. 3, the larger the low duty of the pulse signal output from the DEV_CONT terminal, the larger the absolute value of the developing voltage Vdev.

We return to the explanation of FIG. 2. By the above operation, a stable developing voltage Vdev is generated and applied to the developing roller 133*a*. A resistor R133 may be included as necessary, as well as a resistor R132, to limit the output current and for the purpose of ESD protection from external sources when the developing roller 133*a* is detached from the image forming apparatus 101. The value of the developing voltage Vdev in Embodiment 1 is −300 V, for example.

(Blade Circuit)

A blade circuit 135*b* is a circuit that generates a blade voltage Vbld, which is a second voltage with a predetermined potential difference with respect to the developing voltage Vdev. The blade voltage Vbld is connected via a Zener diode ZD51 with respect to the developing voltage Vdev. The anode terminal of the Zener diode ZD51 is connected to the charging voltage Vpri via a resistor R50, and the anode terminal side is connected to the blade voltage Vbld. In other words, the blade voltage Vbld is larger in absolute value than the developing voltage Vdev by the Zener voltage of the Zener diode ZD51. The cathode terminal of the Zener diode ZD51 is connected to the developing voltage Vdev output by the developing circuit 133*b*, and the anode terminal is connected to the blade voltage Vbld output by the blade circuit 135*b*.

In the blade circuit 135*b*, a transistor Tr51 is connected in parallel with the Zener diode ZD51. Specifically, the anode terminal of the Zener diode ZD51 is connected to the collector terminal of the transistor Tr51, and the cathode terminal is connected to the emitter terminal of the transistor Tr51. When the transistor Tr51 is turned on, both terminals of the Zener diode ZD51 are shorted, and the blade voltage Vbld is equal to the developing voltage Vdev.

Therefore, the blade circuit 135*b* can be said to be a circuit that selects whether to make the blade voltage Vbld have a predetermined potential difference with respect to the developing voltage Vdev or the same potential. When the transistor Tr51 is turned off, the blade voltage Vbld has a larger absolute value than the developing voltage Vdev (|Vbld|>|Vdev|). The transistor Tr51 functions as a switching means to switch between a first state in which the potential difference between the developing voltage Vdev and the blade voltage Vbld is a first potential difference and a second state in which the potential difference is a second potential difference greater than the first potential difference. In Embodiment 1, the first potential difference is 0 V (|Vbld|=|Vdev|) and the second potential difference is the Zener voltage, but the first potential difference is not limited to 0 V if it is smaller than the second potential difference.

The base terminal of the transistor Tr51 is connected to the emitter terminal through resistors R51 and R52. A capacitor C51 is connected in parallel to the resistor R52. The connection point of the resistor R51 and the resistor R52 is connected to the anode terminal of the diode D51, and the cathode terminal of the diode D51 is connected to the anode terminal of a diode D52. The cathode terminal of the diode D52 is connected to the emitter terminal of the transistor Tr51. The diode D51 has its cathode terminal connected to a BLD_SW terminal of the control portion 200 via a capacitor C50. The diode D52 has its anode terminal connected to the BLD_SW terminal of the control portion 200 via the capacitor C50.

The BLD_SW terminal outputs a pulse signal that alternates between a high-level state and a low-level state. When the BLD_SW terminal is in the low-level state, current flows from the power source voltage V1 to a transistor Tr31, the emitter terminal of a transistor Tr51, the base terminal, the resistor R51, the diode D51, and the capacitor C50 in that order, and finally to the BLD_SW terminal. When the BLD_SW terminal is in a high-level state, the current flowing out of the BLD_SW terminal flows through the capacitor C50, diode D52, and transistor Tr31 to the power source voltage V1. When the pulse signal from the BLD_SW terminal repeats between the high-level state and the low-level state, the capacitor C51 is charged and a base current flows out of the base terminal of the transistor Tr51 stably. When the base current from the base terminal of the transistor Tr51 flows stably, the transistor Tr51 turns on and a short circuit is formed between both terminals of a Zener diode ZD51. On the other hand, when the BLD_SW terminal is fixed to the high-level state or low-level state, the transistor Tr51 turns off and there is no short circuit between both terminals of the Zener diode ZD51.

The first state described above is the state in which the transistor Tr51 is turned on and the anode and cathode terminals of the Zener diode ZD51 are short-circuited. The second state described above is the state in which the transistor Tr51 is turned off and the anode and cathode terminals of the Zener diode ZD51 are not short-circuited. The control portion 200 controls the transistor Tr51 to be in the first state in the separated state and controls the transistor Tr51 to be in the second state in the contacted state. The control portion 200 controls the on-state or off-state of the transistor Tr51 by outputting a signal to control the blade circuit 135*b* from the BLD_SW terminal.

The relationship between the low duty of the pulse signal output from the DEV_CONT terminal and the blade voltage Vbld is shown in part (c) of FIG. 3. Part (c) of FIG. 3 shows the low duty (Lo Duty) of the pulse signal output from the DEV_CONT terminal on the horizontal axis and the blade voltage Vbld on the vertical axis. When the pulse signal is output from the BLD_SW terminal (graph at BLD_SW ON in the figure), the blade voltage Vbld is the same voltage as the developing voltage Vdev. In other words, when a pulse signal that repeats between a high-level state and a low-level state is output from the BLD_SW terminal, the blade voltage Vbld is the same voltage as the developing voltage Vdev in part (b) of FIG. 3. On the other hand, when a pulse signal that repeats between a high-level state and a low-level state is not output from the BLD_SW terminal (the graph in the figure when BLD_SW is OFF), in other words, when the signal is fixed in a high-level state or a low-level state, the following is observed. In other words, the blade voltage Vbld is larger in absolute value than the developing voltage Vdev by a Zener voltage $\Delta Vz$ of the Zener diode ZD51 ($|Vbld|=|Vdev|+\Delta Vz$).

As a result of the above operation, a voltage equal to the developing voltage Vdev or a voltage whose absolute value is larger than the developing voltage Vdev by the Zener voltage ($\Delta Vz$) is applied to the developing blade 135*a*. A resistor R135 may be included as necessary, as well as resistors R132 and R133. The Zener voltage ($\Delta Vz$) in Embodiment 1 is, for example, 100 V. In other words, the value of the blade voltage Vbld when both terminals of Zener diode ZD51 are not shorted is, for example, −400 V (=−300-100).

(Toner Supplying R Circuit)

A toner supplying R circuit 134*b* is a circuit that generates a fourth voltage of negative polarity, a toner supplying R voltage Vtsr, by reducing the charging voltage Vpri by dividing it, and has a configuration almost equivalent to that of the developing circuit 133*b*. The difference is that there is no Zener diode in the voltage divider line with the charging voltage Vpri. The toner supply R circuit 134*b* is connected from the charging voltage Vpri to the power source voltage V1 via a resistor R40 and a transistor Tr41, and the voltage at the collector terminal of the transistor Tr41 is the toner supply R voltage Vtsr. The base terminal of the transistor Tr41 is connected to the emitter terminal by a resistor R49, and a resistor R48 is connected to the output terminal of an operational amplifier IC41.

The toner supplying R circuit 134*b* also provides feedback control of a toner supplying R voltage Vtsr in order to control the toner supplying R voltage Vtsr to a stable and predetermined voltage. The toner supplying R voltage Vtsr is connected to the power source voltage V2 through resistors R44 and R43. The connection point between the resistor R44 and the resistor R43 is connected to the positive input terminal of the operational amplifier IC41. The negative input terminal of the operational amplifier IC41 is connected to the power source voltage V2 via a resistor R46 and a resistor R45, and is further connected to the GND via a capacitor C46. The connection point between resistors R45 and R46 is connected to a TSR_CONT terminal of the control portion 200. A resistor R47 and a capacitor C47 are connected in series between the negative input terminal and the output terminal of the operational amplifier IC41. The resistor R47 and capacitor C47 are provided for phase compensation of the operational amplifier IC41 and contribute to the stability of feedback control. The operational amplifier IC41 is operated by the power source voltage V1.

The TSR_CONT terminal outputs a second pulse signal (hereinafter simply referred to as a pulse signal) that alternates between Hi-Z and low-level states. When the TSR_CONT terminal is in the Hi-Z state, a current flows from the power source voltage V2 through resistors R45 and R46 to charge a capacitor C46. On the other hand, when the TSR_CONT terminal is in the low-level state, the current to discharge the capacitor C46 flows toward the TSR_CONT terminal through the resistor R46. When the TSR_CONT terminal repeats the Hi-Z state and the low-level state, the balance of charging and discharging of the capacitor C46 stabilizes at a predetermined voltage. Therefore, the voltage of the negative input terminal of the operational amplifier IC41 is determined according to the duty of the pulse signal output from the TSR_CONT terminal. If the voltage of the negative input terminal of the operational amplifier IC41 is less than the positive input terminal, the output terminal of the operational amplifier IC41 becomes high-level. The transistor Tr41 is turned off and the absolute value of the toner supplying R voltage Vtsr, which is negative polarity, rises. On the other hand, if the voltage at the negative input terminal of the operational amplifier IC41 is greater than the positive input terminal, the output terminal of the operational amplifier IC41 becomes low-level. The transistor Tr41 is turned on and the absolute value of the toner supplying R voltage Vtsr decreases. This operation makes it possible to control the toner supplying R voltage Vtsr to a predetermined voltage. The control portion 200 performs feedback control of the toner supplying R voltage Vtsr by controlling the low duty of the pulse signal output from the TSR_CONT terminal.

Part (d) of FIG. 3 shows the relationship between the pulse signal output from the TSR_CONT terminal and the toner supplying R voltage Vtsr. Part (d) of FIG. 3 shows the low duty (Lo Duty) of the pulse signal output from the TSR_CONT terminal on the horizontal axis and the toner supplying R voltage Vtsr on the vertical axis. As shown in part (d) of FIG. 3, the larger the low duty of the pulse signal output from the TSR_CONT terminal, the larger the absolute value of the toner supplying R voltage Vtsr.

By the above operation, a stable toner supplying R voltage Vtsr is generated and applied to the toner supplying roller 134*a*. A resistor R134 may be included if necessary, as well as resistors R132, R133, and R135. The value of the toner supplying R voltage Vtsr in Embodiment 1 is −400 V, for example.

(Control During Development Separation)

As mentioned above, the image forming apparatus 101 in Embodiment 1 performs charging current detection while the developing separation mechanism is controlled in the separated state. Specifically, the charging current is detected while the developing roller 133*a*, developing blade 135*a*, and the toner supplying roller 134*a* are separated from each other. Therefore, during the charging current detection, the developing voltage Vdev, blade voltage Vbld, and the toner supplying R voltage Vtsr can functionally be any value.

However, if a high voltage is applied between the contact portions between members while they have stopped rotating, the contact portions will be in a different state from the others, and the characteristics of those portions will be changed. If the developing roller 133*a* is then rotated to form an image, image defects such as threading may occur due to the effect of the changed characteristics of some parts of the surface of the developing roller 133*a*. Even when the developing separation mechanism is in the separated state, the developing roller 133*a* and the toner supplying roller 134*a* are in contact with each other and the developing roller 133*a* and the developing blade 135*a* are in contact with each other. Therefore, the potential difference between the contacting parts, i.e., between the developing roller 133*a* and the toner supplying roller 134*a*, and between the developing roller 133*a* and the developing blade 135*a*, should be zero. The potential difference between the developing roller 133*a* and the toner supplying roller 134*a* can be controlled to zero by controlling both the developing voltage Vdev and the toner supplying R voltage Vtsr to the same predetermined voltage. On the other hand, the blade voltage Vbld can control the potential difference between the developing roller 133*a* and the developing blade 135*a* to zero by outputting a pulse signal from the BLD_SW terminal to short both ends of the Zener diode ZD51.

Figure 4:
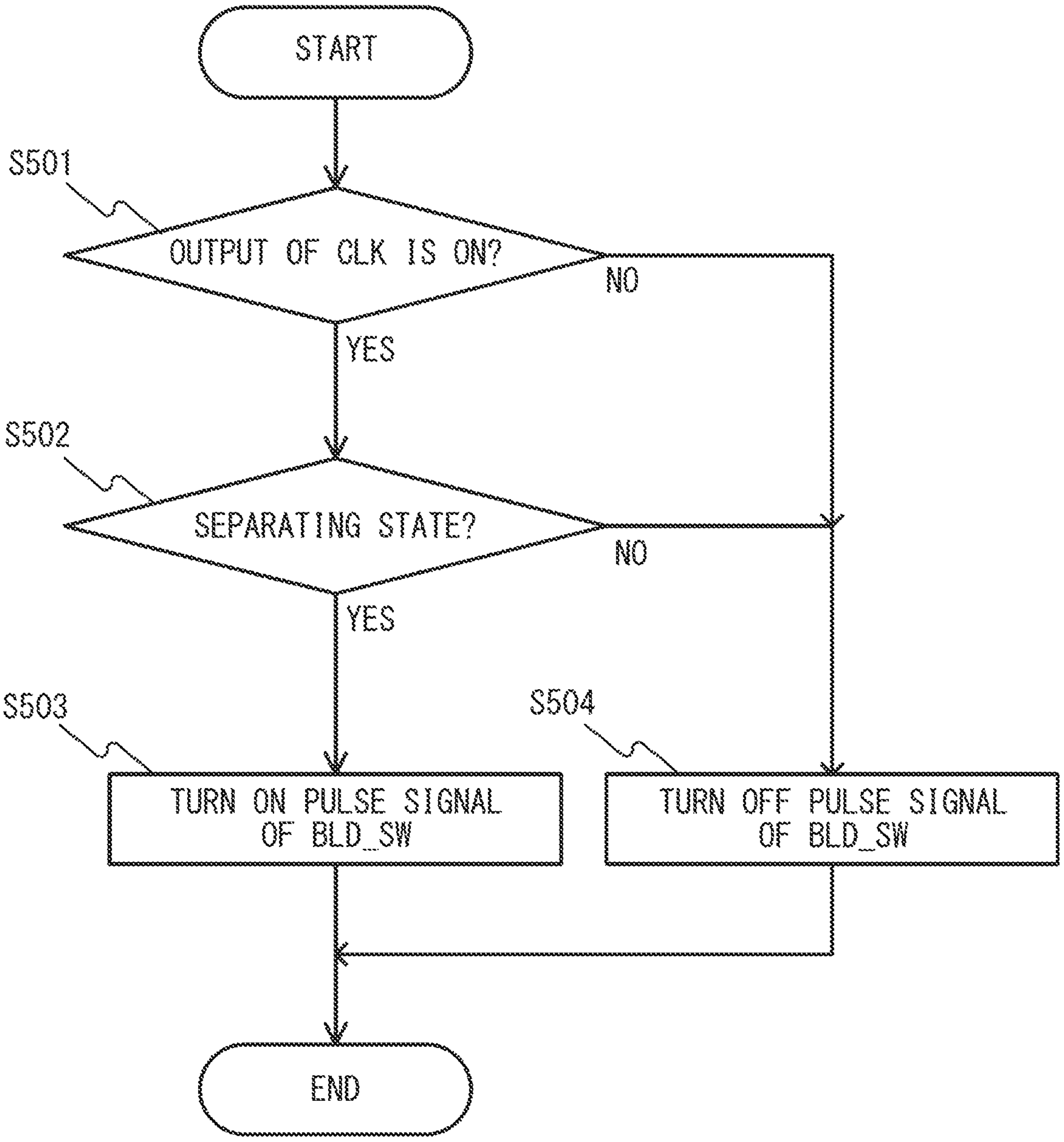
FIG. 4 is a flowchart showing the control of the blade circuit according to Embodiment 1.

In Embodiment 1, the control in which the image forming apparatus 101 sets the potential difference between the developing roller 133*a* and the developing blade 135 to zero is described using the flowchart in FIG. 4. For example, the control portion 200 performs step (hereinafter referred to as "S") 501 and thereafter before detecting the charging current by the charging current detection circuit PRI_ISNS.

At S501, the control portion 200 determines whether or not a pulse signal is being output from the CLK terminal (output ON). If the control portion 200 determines at S501 that a pulse signal is being output from the CLK terminal, the process proceeds to S502. In S502, the control portion 200 determines whether or not the developing separation mechanism is in the separated state. If the control portion 200 determines at S502 that it is in the separated state, the process proceeds to S503. In S503, the control portion 200 outputs a pulse signal from the BLD_SW terminal (pulse signal ON) and terminates the process. Here, "pulse signal ON" means that the pulse signal output from the BLD_SW terminal repeats between the high-level state and the low-level state. This turns on the transistor Tr51 in the blade circuit 135*b*, shorting both terminals of the Zener diode ZD51 and causing the blade voltage Vbld to be the same voltage as the developing voltage Vdev.

If, at S502, the control portion 200 determines that it is not in the separated state, i.e., the developing separation mechanism is in the contacted state, the process proceeds to S504. In S504, the control portion 200 turns off the pulse signal from the BLD_SW terminal and terminates the process. Here, "pulse signal OFF" means that the signal output from the BLD_SW terminal is fixed in a high-level or low-level state, rather than repeating between high-level and low-level states. As a result, the transistor Tr51 of the blade circuit 135*b* is turned off, both terminals of the Zener diode ZD51 are not shorted, and the absolute value of the blade voltage Vbld is larger than the developing voltage Vdev by the Zener voltage (ΔVz) of the Zener diode ZD51.

If the control portion 200 determines at S501 that the CLK terminal is not outputting a pulse signal, the process proceeds to S504. By performing such control, the charging voltage Vpri can be output without causing image defects in the contact portions between the developing roller 133*a* and the developing blade 135*a*, even in an inexpensive configuration where multiple voltages are generated by a common voltage circuit.

According to the above embodiment, an inexpensive circuit configuration can be provided in a configuration with a developing blade. The inexpensive circuit configuration can reduce the occurrence of image defects in the contact portion between the developing roller and the developing blade.

Embodiment 2

Embodiment 2 differs from Embodiment 1 in that the BLD_SW terminal of the control portion 200 is substituted with the DEV_CONT terminal. In Embodiment 2, only the parts that differ from those in Embodiment 1 will be explained, and the same symbols are used for parts that are equivalent to those in Embodiment 1, and explanations will be omitted. In Embodiment 2, the control portion 200 controls the ON state or OFF state of the transistor Tr51 by switching the frequency of the first pulse signal output to the development circuit 133*b*.

(Blade Circuit)

Figure 5:
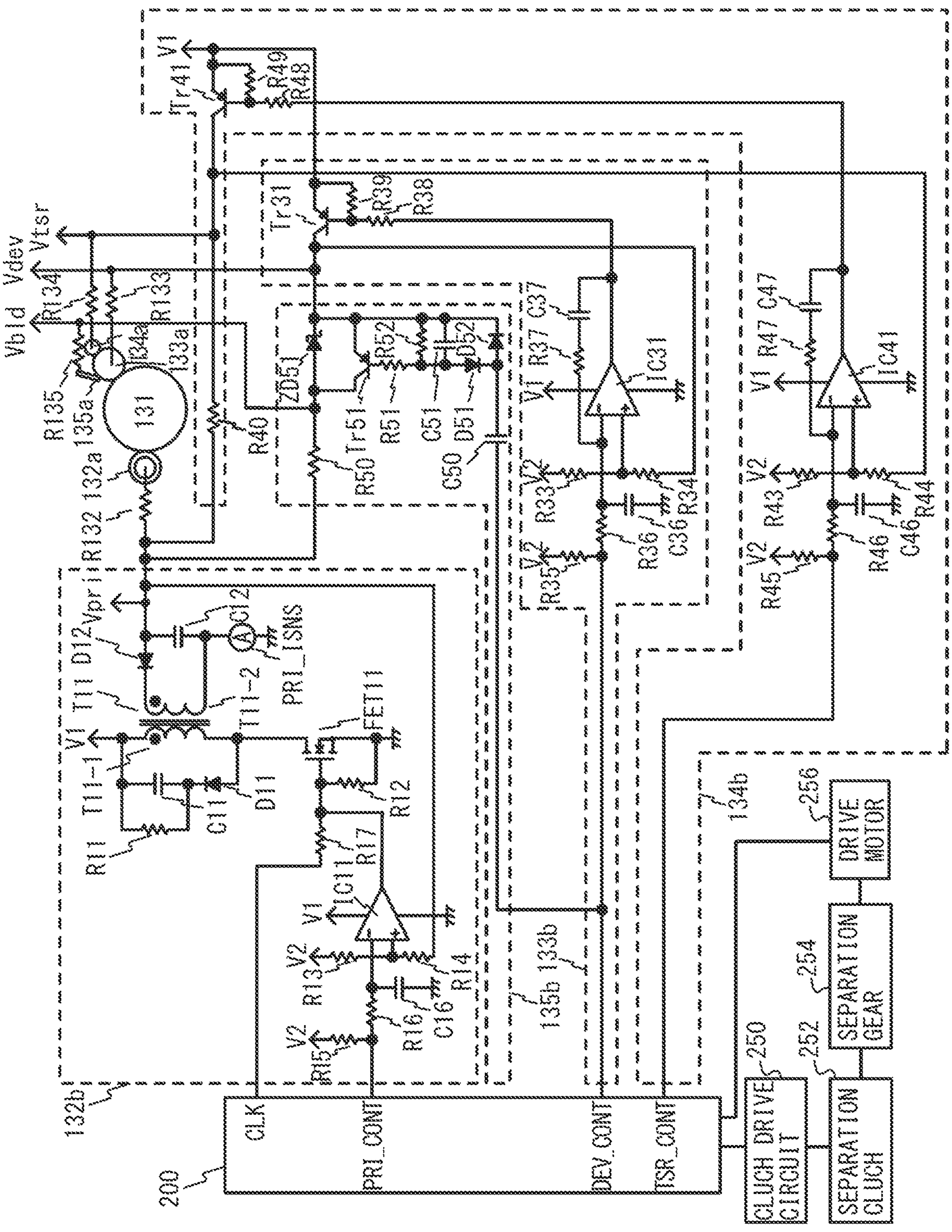
FIG. 5 is a circuit diagram of the imaging forming portion according to Embodiment 2.

FIG. 5 shows the circuit diagram of the image forming portion 103 of Embodiment 2. The difference from FIG. 2 is that one terminal of the capacitor C50 is connected to the DEV_CONT terminal instead of the BLD_SW terminal of the control portion 200. The DEV_CONT terminal outputs a pulse signal that alternates between a high-level state and a low-level state. In the blade circuit 135*b*, when the DEV_CONT terminal is in a low-level state, current flows from the power source voltage V1 to a transistor Tr31, capacitor C51, diode D51, capacitor C50, and finally to the DEV_CONT terminal. When the DEV_CONT terminal is in a high-level state, the current flowing out of the DEV_CONT terminal flows through the capacitor C50, diode D52, and transistor Tr31 to the power source voltage V1. When the DEV_CONT terminal repeats a high-level state and a low-level state, the potential of the capacitor C51 stabilizes. The potential of the capacitor C51 varies with the frequency of the pulse signal output from the DEV_CONT terminal. When the pulse signal frequency is high, the amount of charge charged to the capacitor C51 is greater than the amount of charge discharged, so the potential of the capacitor C51 becomes high. On the other hand, when the pulse signal frequency is low, the potential of the capacitor C51 becomes low because the amount of charge discharged is greater than the amount of charge charged in the capacitor C51. When the potential of the capacitor C51 exceeds the base-to-emitter voltage of the transistor Tr51 Vf, the transistor Tr51 turns on, and when the potential of the capacitor C51 falls below the base-to-emitter voltage of the transistor Tr51 Vf the transistor Tr51 turns off.

In Embodiment 2, the frequency of the pulse signal output from the DEV_CONT terminal is, for example, 20 kHz (low frequency) and 200 kHz (high frequency). At 200 kHz, the potential of the capacitor C51 exceeds the voltage Vf between the base-to-emitter of the transistor Tr51, the transistor Tr51 is turned on, and both terminals between the terminals of the Zener diode ZD51 are shorted. On the other hand, at 20 kHz, the transistor Tr51 turns off and there is no short-circuit between both terminals of the Zener diode ZD51.

Here, the transistor Tr51 is turned on when the frequency of the first pulse signal is above the predetermined frequency and turned off when the frequency of the first pulse signal is below the predetermined frequency. For this reason, Embodiment 2 selects 200 kHz as the frequency above the predetermined frequency and 20 kHz as the frequency below the predetermined frequency. The predetermined frequency may be determined according to the characteristics of the transistor used (voltage Vf as described above) and the circuit configuration to which the transistor Tr51 is connected.

Figure 6:
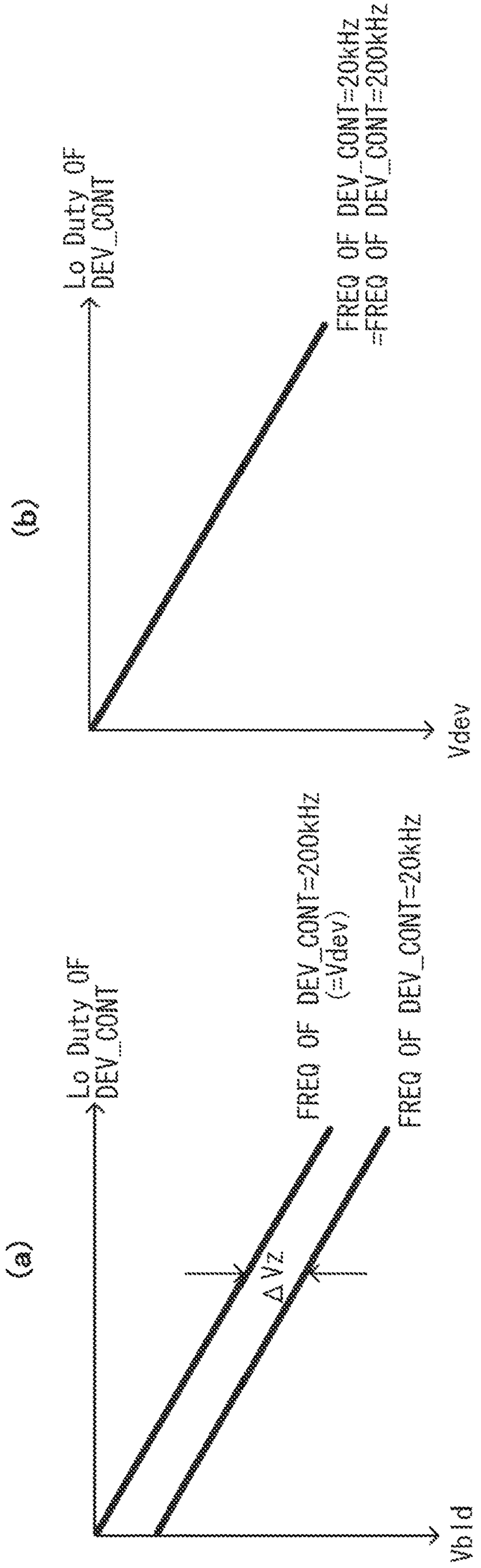
FIG. 6, part (a) and part (b), shows the relationship between the settings and output voltage of each circuit according to Embodiment 2.

The relationship between the low duty of the pulse signal output from the DEV_CONT terminal and the blade voltage Vbld is shown in part (a) of FIG. 6. Part (a) of FIG. 6 shows the low duty (Lo Duty) of the pulse signal output from the DEV_CONT terminal on the horizontal axis and the blade voltage Vbld on the vertical axis. When the frequency of the pulse signal output from the DEV_CONT terminal is 200 kHz, the blade voltage Vbld is the same voltage as the developing voltage Vdev (Vbld=Vdev). On the other hand, when the frequency of the pulse signal output from the DEV_CONT terminal is 20 kHz, the blade voltage Vbld is larger in absolute value than the development voltage Vdev by the Zener voltage ΔVz of the Zener diode ZD51 ($|Vbld|=|Vdev|+\Delta Vz$).

The development voltage Vdev is the voltage corresponding to the low duty of the signal output from the DEV_CONT terminal regardless of the frequency of the pulse signal output from the DEV_CONT terminal. Part (b) of FIG. 6 shows the relationship between the pulse signal output from the DEV_CONT terminal and the development voltage Vdev, with the low duty (Lo Duty) of the pulse signal output from the DEV_CONT terminal on the horizontal axis and the development voltage Vdev on the vertical axis. As shown in part (b) of FIG. 6, the larger the low duty of the pulse signal output from the DEV_CONT terminal, the larger the absolute value of the development voltage Vdev. However, the development voltage Vdev does not depend on the frequency of the pulse signal output from the DEV_CONT terminal.

(Control During Development Separation)

Figure 7:
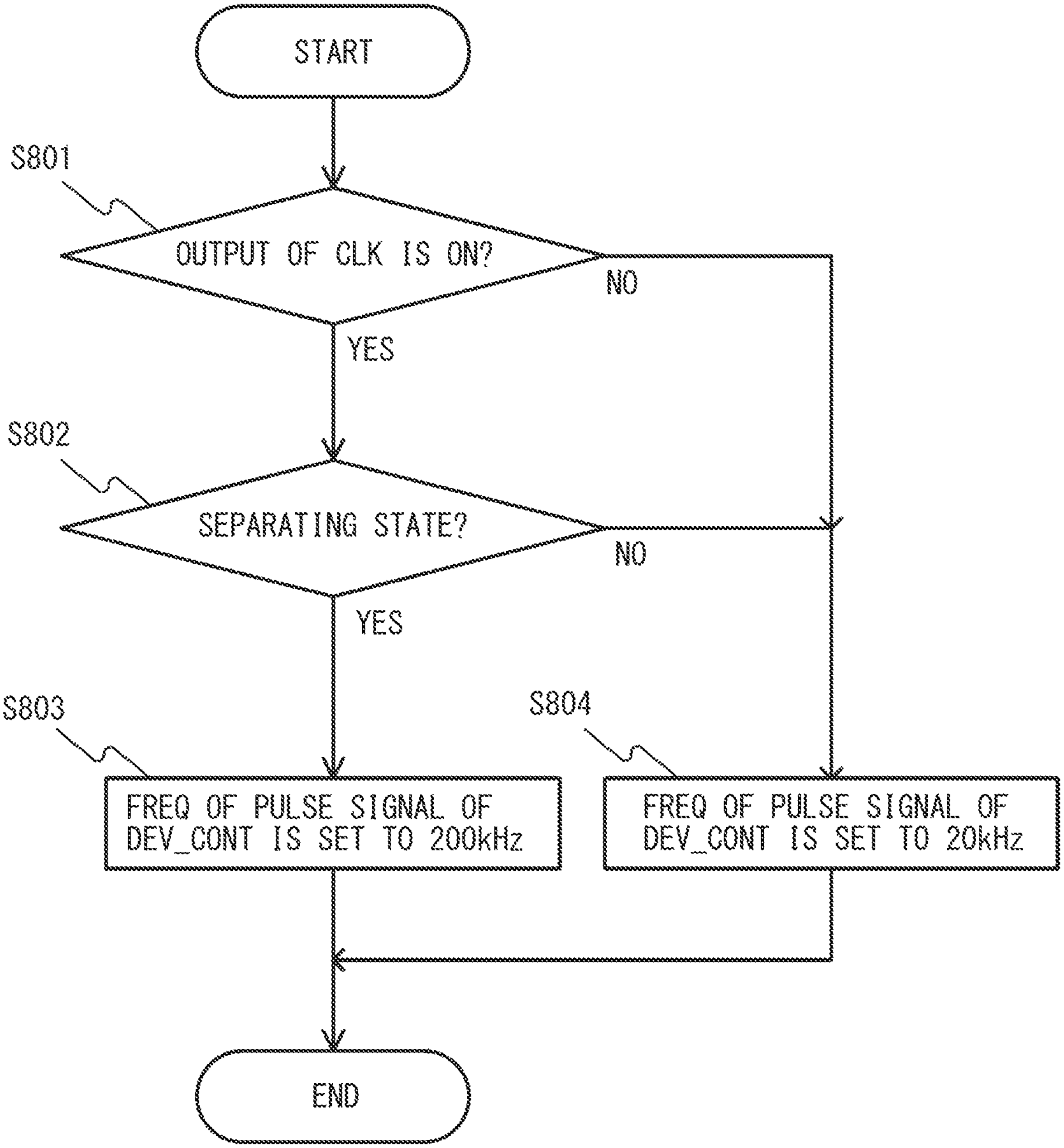
FIG. 7 is a flowchart showing the control of the blade circuit according to Embodiment 2.

In Embodiment 2, the flowchart in FIG. 7 explains the control in which the image forming apparatus 101 sets the potential difference between the developing roller 133*a* and the developing blade 135*a* to zero. The processes of S801 and S802 in FIG. 7 are similar to the processes of S501 and S502 in FIG. 4, so the explanation is omitted. If the control portion 200 determines in S802 that the device is in the separated state, the control portion 200 advances the process to S803. In S803, the control portion 200 outputs the pulse signal output from the DEV_CONT terminal with a higher frequency, e.g., 200 kHz. As a result, the transistor Tr51 is turned on, both terminals of the Zener diode ZD51 are shorted, and the blade voltage Vbld becomes the same voltage as the developing voltage Vdev.

On the other hand, if the control portion 200 determines in S802 that it is not in the separated state, i.e., the developing separation mechanism is in the contacted state, the control portion 200 advances the process to S804. In S804, the control portion 200 outputs the pulse signal output from the DEV_CONT terminal with a lower frequency, e.g., 20 kHz. As a result, the transistor Tr51 is turned off, both terminals of the Zener diode ZD51 are not shorted, and the absolute value of the blade voltage Vbld becomes larger than the developing voltage Vdev by the Zener voltage of the Zener diode ZD51. Even when the CLK terminal of the control portion 200 is not outputting a pulse signal in S801, the frequency of the pulse signal output from the DEV_CONT terminal is set to the lower 20 kHz.

As described above, in Embodiment 2, the potential difference between the developing roller 133*a* and the developing blade 135*a* is switched by changing the frequency of the pulse signal output from the DEV_CONT terminal.

Modified Embodiment

One terminal of the capacitor C50 of the blade circuit 135*b* may be connected to the TSR_CONT terminal instead of the DEV_CONT terminal. In this case, the frequency of the pulse signal output from the TSR_CONT terminal is switched instead of the DEV_CONT terminal. This may switch the potential difference between the developing roller 133*a* and the developing blade 135*a*.

The control portion 200 controls the ON state or OFF state of the transistor Tr51 by switching the frequency of the second pulse signal (pulse signal output from the TSR_CONT terminal) output to the toner supplying R circuit 134*b*. The transistor Tr51 is turned on when the frequency of the second pulse signal is above the predetermined frequency and turned off when the frequency of the second pulse signal is below the predetermined frequency. In other words, when the frequency of the second pulse signal is controlled above the predetermined frequency, the transistor Tr51 is in the ON state, the terminals between both terminals of the Zener diode ZD51 are shorted, and the blade voltage Vbld and the developing voltage Vdev become the same voltage. On the other hand, when the frequency of the second pulse signal is controlled below the predetermined frequency, the transistor Tr51 is turned off, both terminals of the Zener diode ZD51 are not short-circuited, and the blade voltage Vbld becomes larger in absolute value than the developing voltage Vdev by the Zener voltage.

By performing the control described above, in addition to the effect of Embodiment 1, the signals of the control unit 200 can be reduced, and the charging voltage Vpri can be output at a lower cost and without causing image defects in the contact portions between the developing roller 133*a* and the developing blade 135*a*.

According to Embodiment 2, an inexpensive circuit configuration can be provided in a configuration with a developing blade. The inexpensive circuit configuration can reduce the occurrence of image defects in the contact portion between the developing roller and the developing blade.

Embodiment 3

The following is an explanation regarding Embodiment 3.

(Charging Current Detection)

Figure 8:
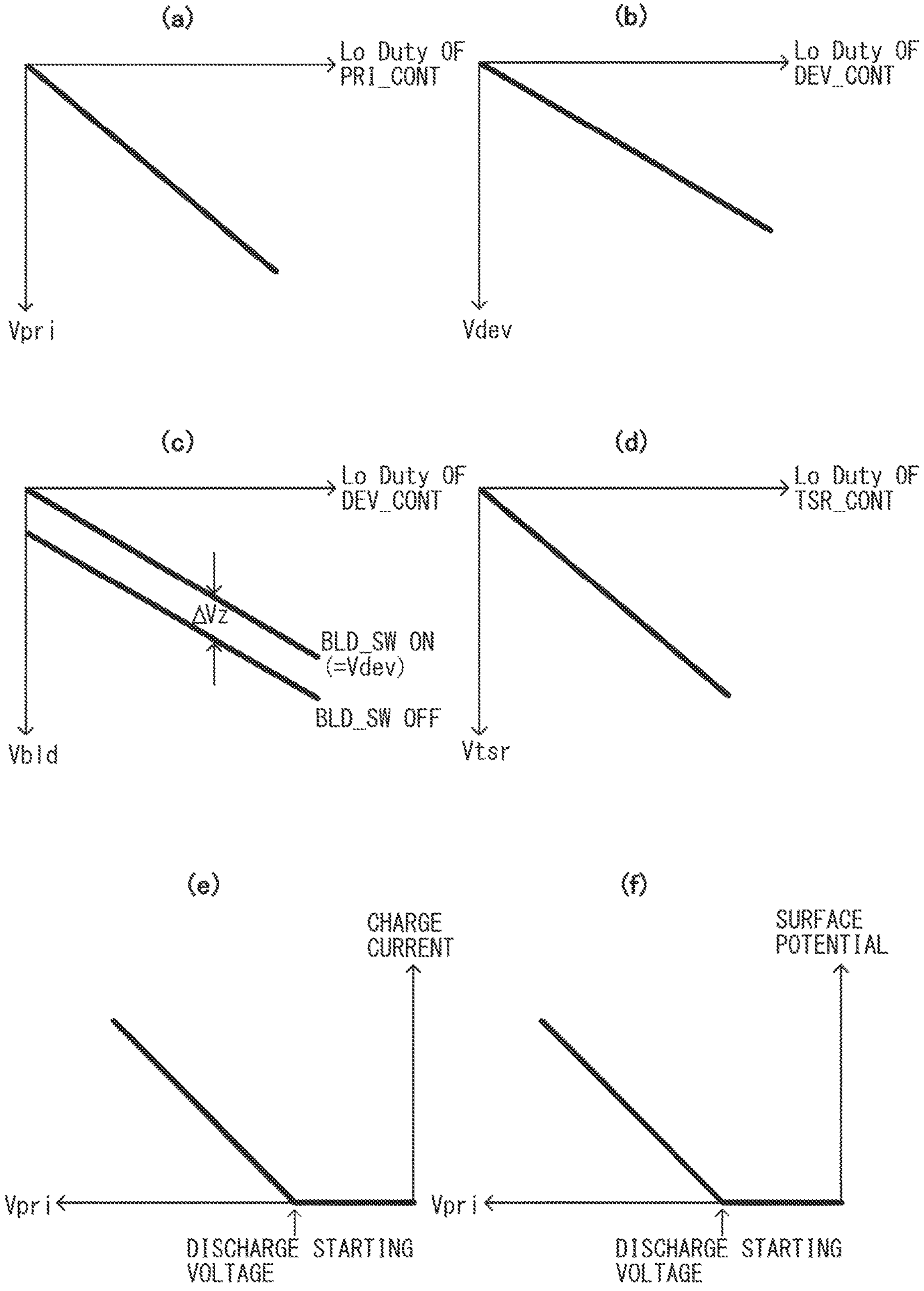
FIG. 8, part (a) to part (f), is a drawing showing the relationship between the setting value (pulse signal) and output voltage of each circuit according to Embodiment 3, and the relationship between the potential or charging current on the surface of the photosensitive drum and the charging voltage.

A charging current detection circuit PRI_ISNS is a circuit that detects the current supplied to the charging roller 132*a* (hereinafter referred to as the charging current). A known method for accurately detecting the potential of the surface of the photosensitive drum 131 is to detect the voltage at which discharge initiating voltage from the charging roller 132*a* to the photosensitive drum 131 (hereinafter referred to as discharge initiating voltage) starts. The relationship between the charging voltage Vpri and the charging current or the surface potential of the photosensitive drum 131 is shown in parts (e) and (f) of FIG. 8. Part (e) of FIG. 8 shows the charging voltage (negative) on the horizontal axis and the charging current on the vertical axis. Part (f) of FIG. 8 shows the charging voltage (negative) on the horizontal axis and the surface potential of the photosensitive drum 131 on the vertical axis. Parts (e) and (f) of FIG. 8 are used to explain the transition between the charging current and the surface potential of the photosensitive drum 131 when the charging voltage Vpri is gradually increased in absolute value from 0 V. The charging voltage Vpri starts to increase from 0 V, and for a while, the charging current does not flow (0 A). When the charging voltage Vpri reaches the discharge initiating voltage, discharge from the charging roller 132*a* to the photosensitive drum 131 starts, and the charging current begins to flow (part (e) of FIG. 8). The surface potential of the photosensitive drum 131 is 0 V at this point, and then it increases with the charging voltage Vpri, maintaining the same potential difference from the discharge initiating voltage (i.e., the lines of the graph remain parallel) (part (f) of FIG. 8). Therefore, if the discharge initiating voltage is detected, the surface potential of the photosensitive drum 131 can be accurately detected based on the charging voltage Vpri and the discharge initiating voltage. However, since the charging current detection must correctly detect the discharge current from the charging roller 132*a* to the photosensitive drum 131, it must be detected while the developing roller 133*a* is separated from the photosensitive drum 131. In other words, the control portion 200 controls the developing separation mechanism so that the developing roller 133*a* is in the separated state when the current flowing to the charging roller 132*a* is detected by the charging current detection circuit PRI_ISNS. In Embodiment 3, the charging current detection is performed with the developing separation mechanism controlled in the separated state during non-image forming control. In other words, the charging current detection is an example of a special process.

(Developing Circuit)

The developing circuit 133*b* is a circuit that generates a second voltage of negative polarity, the developing voltage Vdev, by reducing the charging voltage Vpri by a voltage divider. In other words, it can be said that the developing circuit 133*b* is subordinate to the charging circuit 132*b*. The developing circuit 133*b* is connected from the charging voltage Vpri to the power source voltage V1 via the resistor R50, Zener diode ZD51, and transistor Tr31. The developing circuit 133*b* outputs the voltage at the corrector terminal of the transistor Tr31 as the developing voltage Vdev. A resistor R39 is connected between the base terminal of the transistor Tr31 and the emitter terminal, and a resistor R38 is connected to the output terminal of the operational amplifier IC31.

The developing circuit 133*b* also provides feedback control of the developing voltage Vdev in order to control the developing voltage Vdev to a stable and predetermined voltage. The developing voltage Vdev is connected to the power source voltage V2 through resistors R34 and R33. The connection point between the resistor R34 and the resistor R33 is connected to the positive input terminal of the operational amplifier IC31. The negative input terminal of the operational amplifier IC31 is connected to the power source voltage V2 via resistors R36 and R35, and is also connected to GND via capacitor C36. The connection point between the resistors R35 and R36 is connected to the DEV_CONT terminal of the control portion 200. A resistor R37 and a capacitor C37 are connected in series between the negative input terminal and the output terminal of the operational amplifier IC31. The resistor R37 and capacitor C37 are provided for phase compensation of the operational amplifier IC31 and contribute to the stability of feedback control. The operational amplifier IC31 is operated by the power source voltage V1.

The DEV_CONT terminal of the control portion 200 outputs a second pulse signal (hereinafter simply referred to as a pulse signal) that alternates between Hi-Z and low-level states. When the pulse signal from the DEV_CONT terminal is in the Hi-Z state, a current flows from the power source voltage V2 through resistors R35 and R36 to charge the capacitor C36. On the other hand, when the pulse signal from the DEV_CONT terminal is in the low-level state, the current to discharge the capacitor C36 flows toward the DEV_CONT terminal through the resistor R36. When the DEV_CONT terminal repeats the Hi-Z state and the low-level state, the balance of charging and discharging of the capacitor C36 stabilizes at a predetermined voltage. Therefore, the voltage of the negative input terminal of the operational amplifier IC31 is determined according to the duty of the pulse signal output from the DEV_CONT terminal.

If the voltage at the negative input terminal of the operational amplifier IC31 is less than the positive input terminal, the output terminal of the operational amplifier IC31 becomes high-level. As a result, the transistor Tr31 is turned off and the absolute value of the developing voltage Vdev increases. On the other hand, if the voltage at the negative input terminal of the operational amplifier IC31 is greater than the positive input terminal, the output terminal of the operational amplifier IC31 becomes low-level. As a result, the transistor Tr31 is turned on and the absolute value of the developing voltage Vdev decreases. This operation makes it possible to control the developing voltage Vdev to a predetermined voltage. The control portion 200 controls the second power source, the developing circuit 133B, by outputting the second pulse signal. The control portion 200 performs feedback control of the developing voltage Vdev by controlling the low duty of the pulse signal output from the DEV_CONT terminal.

Part (b) of FIG. 8 shows the relationship between the pulse signal output from the DEV_CONT terminal and the development voltage Vdev, with the low duty (Lo Duty) of the pulse signal output from the DEV_CONT terminal on the horizontal axis and the development voltage Vdev on the vertical axis. As shown in part (b) of FIG. 8, the larger the low duty of the pulse signal output from the DEV_CONT terminal, the larger the absolute value of the development voltage Vdev.

Let us return to the explanation in FIG. 2. By the above operation, a stable developing voltage Vdev is generated and applied to the developing roller 133*a*. A resistor R133 may be included as necessary, as well as a resistor R132, to limit the output current and for the purpose of ESD protection from extremal sources when the developing roller 133*a* is detached from the image forming apparatus 101. The value of the developing voltage Vdev in Embodiment 3 is −300 V, for example.

(Blade Circuit)

The blade circuit 135*b* is a circuit that generates a blade voltage Vbld, which is a third voltage with a predetermined potential difference with respect to the developing voltage Vdev. The blade voltage Vbld is connected via the Zener diode ZD51 with respect to the developing voltage Vdev. The anode terminal of the Zener diode ZD51 is connected to the charging voltage Vpri via a resistor R50, and the anode terminal side is the blade voltage Vbld. In other words, the blade voltage Vbld is larger in absolute value than the developing voltage Vdev by the Zener voltage of the Zener diode ZD51. The cathode terminal of the Zener diode ZD51 is connected to the developing voltage Vdev output by the developing circuit 133*b*, and the anode terminal is connected to the blade voltage Vbld output by the blade circuit 135*b*.

In the blade circuit 135*b*, a transistor Tr51 is connected in parallel with the Zener diode ZD51. Specifically, the anode terminal of the Zener diode ZD51 is connected to the collector terminal of the transistor Tr51, and the cathode terminal is connected to the emitter terminal of the transistor Tr51. When the transistor Tr51 is turned on, both terminals of the Zener diode ZD51 are shorted, and the blade voltage Vbld is equal to the developing voltage Vdev.

Therefore, the blade circuit 135*b* can be said to be a circuit that selects whether to make the blade voltage Vbld have a predetermined potential difference with respect to the developing voltage Vdev or the same potential. When the transistor Tr51 is turned off, the blade voltage Vbld has a larger absolute value than the developing voltage Vdev (|Vbld|>|Vdev|). The transistor Tr51 functions as a switching means to switch between a first state in which the potential difference between the developing voltage Vdev and the blade voltage Vbld is a first potential difference and a second state in which the potential difference is a second potential difference greater than the first potential difference. In Embodiment 3, the first potential difference is 0 V (|Vbld|=|Vdev|) and the second potential difference is the Zener voltage, but the first potential difference is not limited to 0 V if it is smaller than the second potential difference.

The base terminal of the transistor Tr51 is connected to the emitter terminal through resistors R51 and R52. A capacitor C51 is connected in parallel to the resistor R52. The connection point of the resistors R51 and R52 is connected to the anode terminal of a diode D51, and the cathode terminal of the diode D51 is connected to the anode terminal of a diode D52. The cathode terminal of the diode D52 is connected to the emitter terminal of the transistor Tr51. The cathode terminal of the diode D51 is connected to the BLD_SW terminal of the control portion 200 via the capacitor C50. The anode terminal of the diode D52 is connected to the BLD_SW terminal of the control portion 200 via the capacitor C50.

The BLD_SW terminal outputs a pulse signal that alternates between a high-level state and a low-level state. When the BLD_SW pin is in the excessive state where it switches from the high-level state to the low-level state, current flows from the power source voltage V1 to the transistor Tr31, the emitter terminal of the transistor Tr51, the base terminal, resistor R51, diode D51, and capacitor C50 in that order. And finally, it flows into the BLD_SW terminal. In the excessive state where the BLD_SW terminal switches from the low-level state to the high-level state, the current flowing out of the BLD_SW terminal flows through the capacitor C50, diode D52, and transistor Tr31 to the power source voltage V1. When the pulse signal from the BLD_SW terminal repeats between high-level state and low-level state, the capacitor C51 is charged and the base current flows out of the base terminal of the transistor Tr51 in a stable manner. When the base current from the base terminal of the transistor Tr51 flows stably, the transistor Tr51 turns on and a short circuit is formed between both terminals of the Zener diode ZD51. On the other hand, when the BLD_SW terminal is fixed to the high-level state or low-level state, the transistor Tr51 turns off and there is no short-circuit between both terminals of the Zener diode ZD51.

The first state described above is the state in which the transistor Tr51 is turned on and the anode and cathode terminals of the Zener diode ZD51 are short-circuited. The second state described above is the state in which the transistor Tr51 is turned off and the anode and cathode terminals of the Zener diode ZD51 are not short-circuited. The control portion 200 controls the transistor Tr51 to be in the first state in the separated state and to be in the second state in the contacting state. The control portion 200 controls the on-state or off-state of the transistor Tr51 by outputting a signal to control the blade circuit 135*b* from the BLD_SW terminal.

The relationship between the low duty of the pulse signal output from the DEV_CONT terminal and the blade voltage Vbld is shown in part (c) of FIG. 8. Part (c) of FIG. 8 shows the low duty (Lo Duty) of the pulse signal output from the DEV_CONT terminal on the horizontal axis and the blade voltage Vbld on the vertical axis. When the pulse signal is output from the BLD_SW terminal (graph at BLD_SW ON in the figure), the blade voltage Vbld is the same voltage as the developing voltage Vdev. In other words, when a pulse signal that repeats between a high-level state and a low-level state is output from the BLD_SW terminal, the blade voltage Vbld is the same voltage as the developing voltage Vdev in part (b) of FIG. 8. On the other hand, when the pulse signal that repeats between the high-level state and the low-level state is not output from the BLD_SW terminal (graph at BLD_SW OFF in the figure), in other words, when the signal is fixed to the high-level state or the low-level state, the following occurs. The blade voltage Vbld is larger in absolute value than the developing voltage Vdev by the Zener voltage ΔVz of the Zener diode ZD51 (|Vbld|=|Vdev|+ΔVz).

As a result of the above operation, a voltage equal to the developing voltage Vdev or a voltage whose absolute value is larger than the developing voltage Vdev by the Zener voltage (ΔVz) is applied to the developing blade 135*a* A resistor R135 may be included as necessary, as well as resistors R132 and R133. The Zener voltage (ΔVz) in Embodiment 3 is, for example, 100 V. That is, the value of the blade voltage Vbld when both terminals of the Zener diode ZD51 are not shorted together is, for example, −400 V (=−300-100).

(Toner Supplying R Circuit)

A toner supplying R circuit 134*b* is a circuit that generates a fourth voltage of negative polarity, a toner supplying R voltage Vtsr, by reducing the charging voltage Vpri by dividing it, and has a configuration almost equivalent to that of the developing circuit 133*b*. The difference is that there is no Zener diode in the voltage divider line with the charging voltage Vpri. The toner supplying R circuit 134*b* is connected from the charging voltage Vpri to the power source voltage V1 via a resistor R40 and a transistor Tr41, and the voltage at the collector terminal of the transistor Tr41 is the toner supplying R voltage Vtsr. The base terminal of the transistor Tr41 is connected to the emitter terminal by a resistor R49, and a resistor R48 is connected to the output terminal of the operational amplifier IC41.

The toner supplying R circuit 134*b* also provides feedback control of the toner supplying R voltage Vtsr in order to control the toner supplying R voltage Vtsr to a stable and predetermined voltage. The toner supplying R voltage Vtsr is connected to the power source voltage V2 through resistors R44 and R43. The connection point between the resistors R44 and R43 is connected to the positive input terminal of the operational amplifier IC41. The negative input terminal of the operational amplifier IC41 is connected to the power source voltage V2 via resistors R46 and R45, and is also connected to the GND via a capacitor C46. The connection point between the resistors R45 and R46 is connected to a TSR_CONT terminal of the control portion 200. A resistor R47 and a capacitor C47 are connected in series between the negative input terminal and the output terminal of the operational amplifier IC41. The resistor R47 and capacitor C47 are provided for phase compensation of the operational amplifier IC41 and contribute to the stability of feedback control. The operational amplifier IC41 is operated by the power source voltage V1.

The TSR_CONT terminal outputs a fourth pulse signal (hereinafter simply referred to as a pulse signal) that alternates between Hi-Z and low-level states. When the TSR_CONT terminal is in the Hi-Z state, a current flows from the power source voltage V2 through resistors R45 and R46 to charge the capacitor C46. On the other hand, when the TSR_CONT terminal is in the low-level state, the current to discharge the capacitor C46 flows toward the TSR_CONT terminal through the resistor R46. When the TSR_CONT terminal repeats the Hi-Z state and the low-level state, the balance of charging and discharging of the capacitor C46 stabilizes at a predetermined voltage. Therefore, the voltage of the negative input terminal of the operational amplifier IC41 is determined according to the duty of the pulse signal output from the TSR_CONT terminal. If the voltage of the negative input terminal of the operational amplifier IC41 is less than the positive input terminal, the output terminal of the operational amplifier IC41 is high. The transistor Tr41 is turned off and the absolute value of the toner supplying R voltage Vtsr, which is negative polarity, increases. On the other hand, if the voltage at the negative input terminal of the operational amplifier IC41 is greater than the positive input terminal, the output terminal of the operational amplifier IC41 becomes low-level. The transistor Tr41 is turned on and the absolute value of the toner supplying R voltage Vtsr decreases. This operation makes it possible to control the toner supplying R voltage Vtsr to a predetermined voltage. The control portion 200 performs feedback control of the toner supplying R voltage Vtsr by controlling the low duty of the pulse signal output from the TSR_CONT terminal.

Part (d) of FIG. 8 shows the relationship between the pulse signal output from the TSR_CONT terminal and the toner supplying R voltage Vtsr. Part (d) of FIG. 8 shows the low duty (Lo Duty) of the pulse signal output from the TSR_CONT terminal on the horizontal axis and the toner supplying R voltage Vtsr on the vertical axis. As shown in part (d) of FIG. 8, the larger the low duty of the pulse signal output from the TSR_CONT terminal, the larger the absolute value of the toner supplying R voltage Vtsr.

By the above operation, a stable toner supplying R voltage Vtsr is generated and applied to the toner supplying roller 134*a*. A resistor R134 may be included if necessary, as well as resistors R132, R133, and R135. The value of the toner supplying R voltage Vtsr in Embodiment 3 is −400 V, for example.

(Control During Development Separation)

As described above, in the image forming apparatus 101 of Embodiment 3, the charging current is detected while the developing separation mechanism is controlled in the separated state. Specifically, the charging current is detected while the developing roller 133*a*, developing blade 135*a*, and the toner supplying roller 134*a* are separated from each other. Therefore, during the charging current detection, the developing voltage Vdev, blade voltage Vbld, and the toner supplying R voltage Vtsr can functionally be any value.

However, if a high voltage is applied between members in contact portions while these members have stopped rotating, the contact portions will be in a different state from the others, causing image defects such as threading. Even when the developing separation mechanism is in the separated state, the developing roller 133*a* and the toner supplying roller 134*a* are in contact with each other, and the developing roller 133*a* and the developing blade 135*a* are in contact with each other. Therefore, the potential difference between the contacting members, i.e., between the developing roller 133*a* and the toner supplying roller 134*a*, and between the developing roller 133*a* and the developing blade 135*a*, should be small.

The developing voltage Vdev and the toner supplying R voltage Vtsr are both controlled to the same predetermined voltage with a larger absolute value than the voltage during the image forming control process. This allows the potential difference between the developing roller 133*a* and the toner supplying roller 134*a* to be controlled to be small while reducing the load on the transformer. In other words, the control portion 200 outputs a fourth pulse signal such that the potential difference between the second and fourth voltages becomes a third potential difference in the separated state, and a fourth pulse signal such that the potential difference becomes a fourth potential difference greater than the third potential difference in the contacting state. As a result, the potential difference between the developing roller 133*a* and the toner supplying roller 134*a* is also controlled so that the potential difference is changed between the image forming process and the special process. On the other hand, the blade voltage Vbld can be controlled to reduce the potential difference between the developing roller 133*a* and the developing blade 135*a* by outputting a pulse signal from the BLD_SW terminal to short both ends of the Zener diode ZD51.

Control in Embodiment 3

The power source in Embodiment 3 is configured to generate a main source voltage from a single transformer and to generate multiple different voltages with voltage divider control. Here, the main source voltage is a charging voltage Vpri generated by the charging circuit 132*b*. In this configuration, when the control is to turn off unused voltages to reduce the potential difference between each developing component member while the developing components are stopped, the specifications required for a transformer T11 are higher than the specifications required for the electrophotographic process. Note that the developing component members are stopped during the special process. If a transformer is used that meets the specifications required when the developing component members are stopped, the specifications of the transformer will be excessive for the electrophotographic process. The control of Embodiment 3 to solve these issues is explained below.

Figure 9:
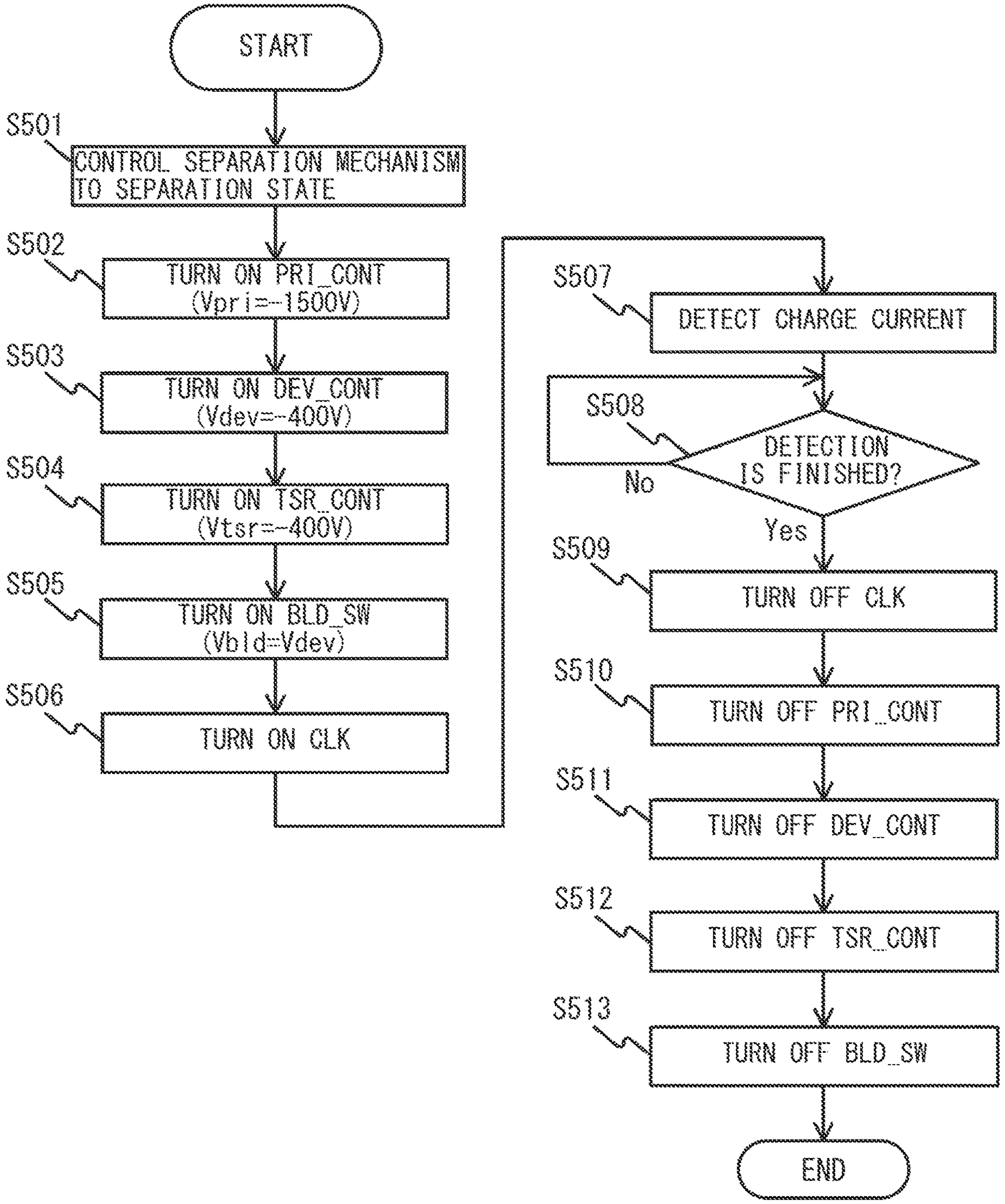
FIG. 9 is a flowchart showing the control of the voltage according to Embodiment 3.

In Embodiment 3, the control in which the image forming apparatus 101 reduces the potential difference between a developing roller 133*a* and a toner supplying roller 134*a*, and between a developing roller 133*a* and a developing blade 135*a*, is described using FIG. 9. Hereafter, the space between the developing roller 133*a* and the toner supplying roller 134*a*, and the space between the developing roller 133*a* and the developing blade 135*a* will be expressed as the space between the developing roller 133*a* and the toner supplying roller 134*a* and the developing blade 135*a*. In the explanation that follows, the detection of the charging current (hereinafter referred to as the charging current detection process) described above as a special process will be used as an example.

When the special process, e.g., detection of the charging current by the charging current detection circuit PRI_ISNS, is started, the control portion 200 executes step (hereinafter referred to as S) 501 and subsequent processes. In S501, the control portion 200 controls the developing separation mechanism so that the photosensitive drum 131 and the developing component members are separated from each other. In S502, the control portion 200 outputs a control signal from a PRI_CONT terminal such that the charging voltage Vpri becomes a predetermined voltage, e.g., −1500 V (PRI_CONT is turned on).

In S503, the control portion 200 outputs a control signal from the DEV_CONT terminal such that the developing voltage Vdev becomes a predetermined voltage, for example, −400 V (DEV_CONT is turned on). In other words, the control portion 200 controls so that the absolute value of the developing voltage Vdev during the charging current detection process (e.g., |−400V|) is larger than the absolute value of the developing voltage Vdev during the image forming process (e.g., |−300V|). At S504, the control portion 200 outputs a control signal from the TSR_CONT terminal such that the toner supplying R voltage Vtsr becomes a predetermined voltage, for example, −400 V (TSR_CONT is turned on). At S505, the control portion 200 outputs a pulse signal from the BLD_SW terminal to control the blade voltage Vbld to become the same potential as the developing voltage Vdev (BLD_SW is turned ON). Here, the control portion 200 controls so that the blade voltage Vld becomes the same potential as the developing voltage Vdev, but it may also control so that the potential difference between the blade voltage Vld and the developing voltage Vdev is smaller than the potential difference during the image forming process. In S506, the control portion 200 outputs a pulse signal from the CLK terminal (CLK is turned on). This outputs the charging voltage Vpri and developing voltage Vdev, the toner supplying R voltage Vtsr, and the blade voltage Vbld.

At S507, the control portion 200 detects the charging current by the charging current detection circuit PRI_ISNS. At S508, the control portion 200 determines whether or not the detection of the charging current by the charging current detection circuit PRI_ISNS has been completed. If the control portion 200 determines at S508 that the detection of the charging current has not been completed, the process returns to S508, and if it determines that it has been completed, the process proceeds to S509. In S509, the control portion 200 stops outputting pulse signals from the CLK terminal (CLK is turned off). The control portion 200 stops outputting the charging voltage Vpri and developing voltage Vdev, the toner supplying R voltage Vtsr, and the blade voltage Vbld. At S510, the control portion 200 stops the pulse signal output from the PRI_CONT terminal (PRI_CONT is turned off). In S511, the control portion 200 stops the pulse signal being output from the DEV_CONT terminal (DEV_CONT is turned off). In S512, the control portion 200 stops the pulse signal being output from the TSR_CONT terminal (TSR_CONT is turned off). In S513, the control portion 200 stops the pulse signal being output from the BLD_SW terminal (BLD_SW is turned off) and terminates the process.

(Set Values for Each Voltage During Image Forming Process and Special Process)

Table 1 shows the set values of each output voltage during the image forming process and during the special process (charging current detection process) in Embodiment 3. In Table 1, the values in the charging current detection as a special process are listed as described above.

TABLE 1

| | Charging voltage Vpri | Developing voltage Vdev | Blade voltage Vbld | Toner supplying R voltage Vtsr |
|---|---|---|---|---|
| Image forming process | −1500 V | −300 V | −400 V | −400 V |
| Charging current detection process | −1500 V | −400 V | −400 V | −400 V |

Table 1 shows each process (image forming process and charging current detection process) in the first column, charging voltage Vpri in the second column, developing voltage Vdev in the third column, blade voltage Vbld in the fourth column, and toner supplying R voltage Vtsr in the fifth column.

The set value of the developing voltage Vdev during the charging current detection is set to a voltage with a larger absolute value, e.g., −400V, compared to the set value during the image forming process (|−400|>|−300|). During the charging current detection process, the blade voltage Vbld and toner supplying R voltage Vtsr are also output at a voltage matching the developing voltage Vdev, for example −400V (Vbld=Vdev, Vtsr=Vdev). However, when −400V is output as the set value during the charging current detection process, in reality, output errors occur due to variations in circuit constants and other factors. Therefore, the blade voltage Vbld and the developing voltage Vdev, and the toner supplying R voltage Vtsr and the developing voltage Vdev are controlled to be the same as much as possible to the extent that the issues of the present invention can be solved, and in this sense, they are output at the same voltage value in short. In other words, the developing voltage Vdev, blade voltage Vbld, and the toner supplying R voltage Vtsr are output at the same or abbreviatedly identical values when a charging current is detected.

This allows the potential difference between the developing roller 133*a*, the developing blade 135*a*, and the toner supplying roller 134*a* to be small, thereby suppressing image defects such as threading. In addition, by making the absolute value of the developing voltage Vdev larger than during the image forming process, the load on the transformer T11 during charging current detection can be smaller than during the image forming process.

Such control prevents the occurrence of image defects in the contact portions of the developing roller 133*a*, the toner supplying roller 134*a*, and the developing blade 135*a*, even in an inexpensive configuration where multiple voltages are generated by a common voltage booster circuit. Furthermore, the transformer capability required during the image forming process can output the charging voltage Vpri even during special processes.

(Other Modifications)

The above embodiments show a circuit that generates each voltage from the charging voltage Vpri, but the present invention is not limited to this. For example, it is sufficient to have a configuration that generates multiple voltages from the same power source, and to control the output of the main source voltage while reducing the potential difference between the multiple dependent voltages.

For example, instead of using the charging voltage Vpri generated by the charging circuit 132_b_ as the main source voltage, the voltage generated by a transfer negative circuit 141_c_ may be used. In this case, the transfer negative circuit 141_c_ corresponds to the first power source and the transfer negative voltage corresponds to the first voltage.

The circuit configuration for generating the developing voltage Vdev, blade voltage Vbld, and the toner supplying R voltage Vtsr should be a circuit that is generated in subordination to the main source voltage. For example, in Embodiment 3, the blade voltage Vbld is controlled by a parallel circuit of the Zener diode ZD51 and the transistor Tr51 connected to the developing voltage Vdev. However, the parallel circuit with the Zener diode ZD51 and the transistor Tr51 may be connected to the toner supplying R voltage Vtsr instead of the developing voltage Vdev. In this case, a toner supplying R circuit 134_b_ corresponds to the third power source, the toner supplying R voltage Vtsr corresponds to the third voltage, the blade circuit 135_b_ corresponds to the fourth power source, and the blade voltage Vbld corresponds to the fourth voltage. The second contacting member corresponds to the developing blade 135_a_, and the first contacting member corresponds to the toner supplying roller 134_a_.

The types of voltages to be controlled are not limited to three, but can be two, four, or more. In other words, the combination of voltages generated subordinate to the main source voltage and its circuit configuration are not limited to the embodiments described above.

Furthermore, the control portion 200 may control the on-state or off-state of the transistor Tr51 by switching the frequency of the second pulse signal output to the second power supply source.

According to the above Embodiment 3, it is possible to suppress image defects caused by contact portions between members involved in the development process with an inexpensive circuit configuration.

Embodiment 4

Embodiment 4 differs from Embodiment 3 in that the configuration of the blade circuit 135_b_ and the developing circuit 133_b_ is the same as that of the toner supplying R circuit 134_b_. In Embodiment 4, only the parts that differ from those in Embodiment 3 are described, and explanations are omitted for parts that are equivalent to those in Embodiment 3.

(Configuration and Operation of High-Voltage Generation Circuit)

Figure 10:
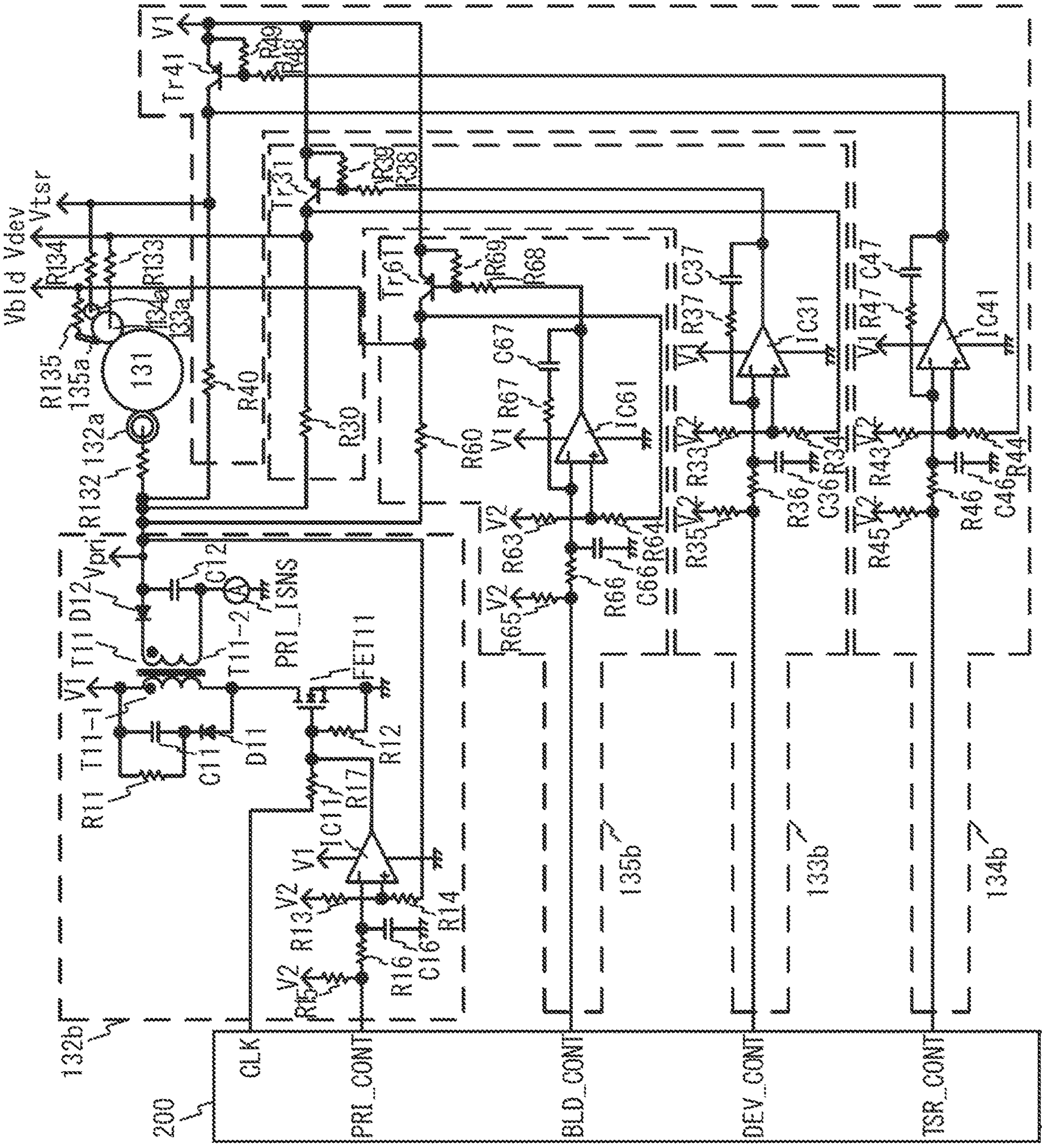
FIG. 10 is a circuit diagram of the imaging forming portion according to Embodiment 4.

FIG. 10 is a drawing of a circuit of the image forming portion 103 of Embodiment 4. The configuration of the blade circuit 135_b_ and the developing circuit 133_b_ differs from that in FIG. 2. In addition, the developing separation mechanism is omitted in FIG. 10.

(Developing Circuit, Blade Circuit)

The developing circuit 133_b_ is connected from the charging voltage Vpri to the power source voltage V1 via a resistor R30 and a transistor Tr31. In the developing circuit 133_b_, the voltage at the corrector terminal of the transistor Tr31 is the developing voltage Vdev.

The blade circuit 135_b_ is connected from the charging voltage Vpri to the power source voltage V1 via a resistor R60 and a transistor Tr61. In the blade circuit 135_b_, the voltage at the corrector terminal of the transistor Tr61 is the blade voltage Vbld. A resistor R69 is connected between the base and emitter terminals of the transistor Tr61. One end of a resistor R68 is connected to the base terminal of the transistor Tr61, and the other end of the resistor R68 is connected to the output terminal of the operational amplifier IC61.

The blade voltage Vbld is connected to the power source voltage V2 via resistors R64 and R63. The connection point between the resistors R64 and R63 is connected to the positive input terminal of the operational amplifier IC61. The negative input terminal of operational amplifier IC61 is connected to the power source voltage V2 via resistors R66 and R65, and is also connected to GND via a capacitor C66. The connection point of resistors R65 and R66 is connected to the BLD_CONT terminal of the control portion 200. A resistor R67 and a capacitor C67 are connected in series between the negative input terminal and the output terminal of the operational amplifier IC61. The resistor R67 and capacitor C67 are provided for phase compensation of the operational amplifier IC61 and contribute to the stability of feedback control. The operational amplifier IC61 is operated by the power source voltage V1.

The BLD_CONT terminal outputs a third pulse signal (hereinafter simply referred to as a pulse signal) that alternates between a Hi-Z state and a low-level state. When the BLD_CONT terminal is in the Hi-Z state, a current flows from the power source voltage V2 through resistors R65 and R66 to charge the capacitor C66. On the other hand, when the BLD_CONT terminal is in the low-level state, the current to discharge a capacitor C46 flows toward the BLD_CONT terminal through the resistor R66. When the BLD_CONT terminal repeats the Hi-Z state and the low-level state, the balance of charging and discharging of the capacitor C66 stabilizes at a predetermined voltage. Therefore, the voltage of the negative input terminal of the operational amplifier IC61 is determined according to the duty of the pulse signal output from the BLD_CONT terminal. In other words, the larger the low duty of the pulse signal output from the BLD_CONT terminal, the larger the absolute value of the blade voltage Vbld, the negative voltage.

If the voltage at the negative input terminal of the operational amplifier IC61 is less than the positive input terminal, the output terminal of the operational amplifier IC61 becomes high-level. At this time, the transistor Tr61 is turned off and the absolute value of the blade voltage Vbld rises. On the other hand, if the voltage at the negative input terminal of the operational amplifier IC61 is greater than the positive input terminal, the output terminal of the operational amplifier IC61 becomes low-level. At this time, the transistor Tr61 is turned on and the absolute value of the blade voltage Vbld decreases. This operation controls the blade voltage Vbld to a predetermined voltage.

Control of Embodiment 4

Figure 11:
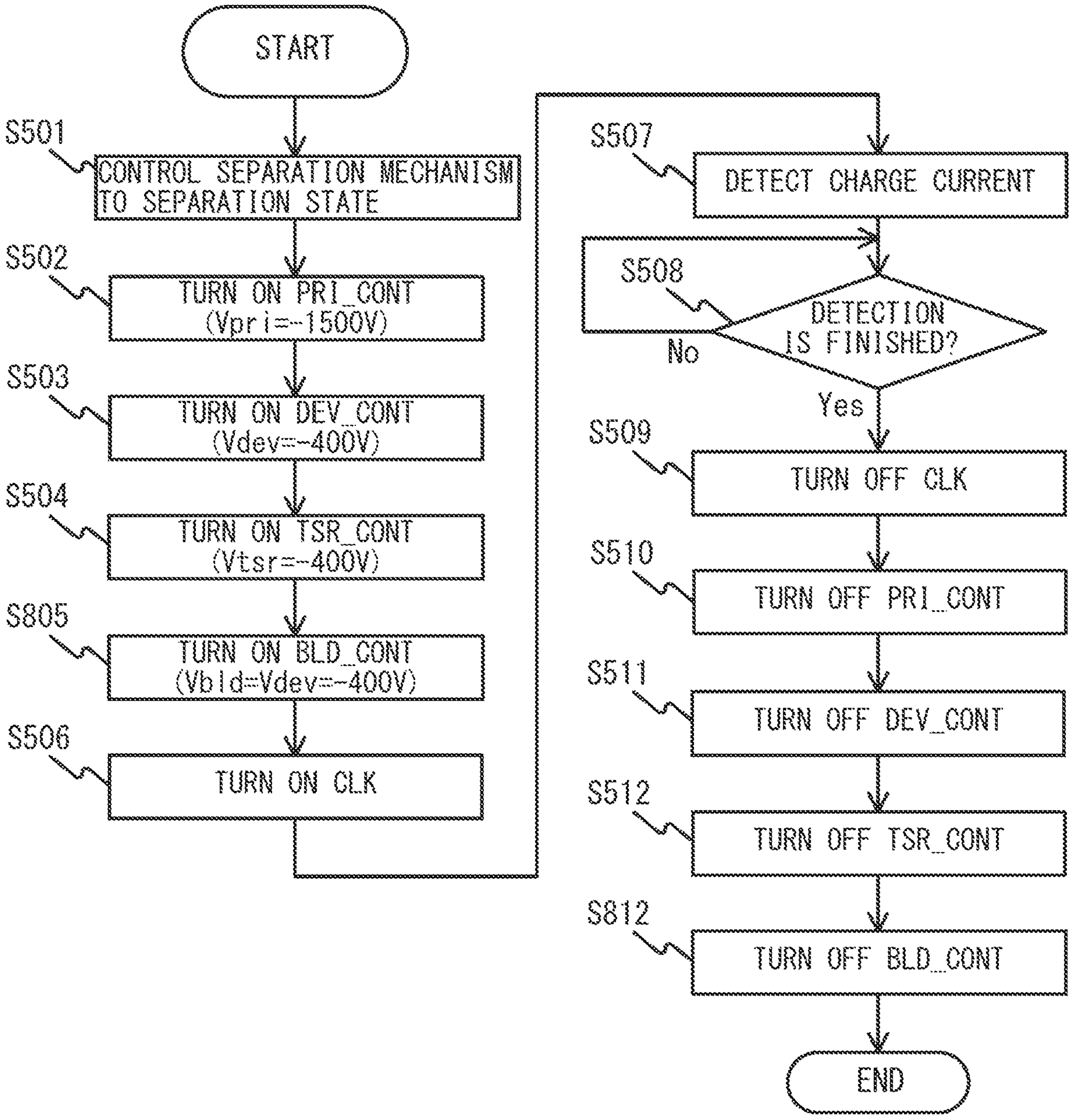
FIG. 11 is a flowchart showing the control of the voltage according to Embodiment 4.

In embodiment 4, the control in which the image forming apparatus 101 reduces the potential difference between the developing roller 133*a*, the developing blade 135*a*, and the toner supplying roller 134*a* is explained using FIG. 11. In FIG. 11, the charging current detection described above as a special process is used as an example. The same step numbers are attached to the parts of the process that are the same as the process in Embodiment 3 (FIG. 9), and the explanations are omitted. After outputting a control signal so that the toner supplying R voltage Vtsr becomes −400 V from the TSR_CONT terminal at S504, the control portion 200 performs the following control at S805. That is, the control portion 200 outputs a control signal from the BLD_CONT terminal such that the toner supplying R voltage Vtsr becomes −400V (BLD_CONT is turned on), and then proceeds to the process in S506. In other words, the control portion 200 functions as a switching means to switch between the first state in which the potential difference between the developing voltage Vdev and the blade voltage Vbld is the first potential difference and the second state in which the potential difference is the second potential difference that is greater than the first potential difference. After stopping the pulse signal output from the TSR_CONT terminal in S512, the control portion 200 stops the pulse signal output from the BLD_CONT terminal (BLD_CONT is turned off) in S812, and the process is terminated.

In Embodiment 4, the control portion 200 can independently select (set) the voltage values of the developing voltage Vdev, blade voltage Vbld, and the toner supplying R voltage Vtsr. In other words, more complex voltage control is possible because there are more choices of each voltage value that can be set. In Embodiment 4, the control described above does not cause image defects in the contact portions of the developing roller 133*a*, the toner supplying roller 134*a*, and the developing blade 135*a*. And the charging voltage Vpri can be output even during special processes with the transformer capability required during the image forming process.

According to the above Embodiment 4, image defects caused by contact portions between members involved in the development process can be suppressed with an inexpensive circuit configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-187247, filed Nov. 17, 2021, and No. 2021-187248, filed Nov. 17, 2021, which are hereby incorporated by reference herein in their entirety.

What is claimed is:

1. An image forming apparatus comprising:

a photosensitive member;

a developing member movable between a contacting position where the developing member contacts the photosensitive member in a contacting state and a separating position where the developing member is separated from the photosensitive member in a separating state, and configured to develop an electrostatic latent image formed on the photosensitive member with toner in the contacting position;

a first contacting member contacting the developing member in a state in which the developing member is positioned in the contacting position and in the separating position;

a first power source including a transformer and configured to generate a first voltage;

a second power source configured to generate a second voltage, from the first voltage, and to apply the second voltage to the developing member;

a third power source configured to generate a third voltage from the second voltage generated by the second power source and to apply the third voltage to the first contacting member; and a controller configured to, when a potential difference between the second voltage and the third voltage is a first potential difference and a potential difference greater than the first potential difference is a second potential difference, control to form the first potential difference in the separating state and to form the second potential difference in the contacting state, wherein the controller controls so that an absolute value of the second voltage in the separating state becomes greater than the absolute value of the second voltage in the contacting state.

2. The image forming apparatus according to claim 1, further comprising a charging member configured to charge the photosensitive member, wherein the first power source is configured to apply the first voltage to the charging member.

3. The image forming apparatus according to claim 2, wherein the controller controls the first power source by outputting a first pulse signal, and wherein the first voltage is a negative polarity and the controller controls so that an absolute value of the first voltage increases as a low duty ratio of the first pulse signal increases.

4. The image forming apparatus according to claim 3, wherein the controller controls the second power source by outputting a second pulse signal, and wherein the second voltage is a negative polarity and the controller controls so that an absolute value of the second voltage increases as a low duty ratio of the second pulse signal increases.

5. The image forming apparatus according to claim 4, wherein the third power source includes:

a Zener diode of which a cathode terminal is connected to the second voltage output from the second power source and an anode terminal is connected to the third voltage output from the third power source; and a transistor of which an emitter terminal is connected to the cathode terminal of the Zener diode and a collector terminal is connected to the anode terminal of the Zener diode, wherein in a state in which the developing member is positioned in the separating position, the anode terminal and the cathode terminal of the Zener diode are shorted by holding the transistor in an ON state, and wherein in a state in which the developing member is positioned in the contacting position, the anode terminal and the cathode terminal of the Zener diode are not shorted by holding the transistor in an OFF state.

6. The image forming apparatus according to claim 5, wherein the controller controls the ON state and the OFF state of the transistor by outputting a signal which controls the third power source.

7. The image forming apparatus according to claim 6, further comprising:

a second contacting member contacting the developing member in the contacting state and the separating state, and a fourth power source configured to generate a fourth voltage and apply the fourth voltage to the second contacting member, wherein the controller controls the fourth power source by outputting a fourth pulse signal, and wherein controller controls to output the fourth pulse signal that makes a potential difference between the second voltage and the fourth voltage be a third potential difference in a state in which the developing member is positioned in the separating position, and to output the fourth pulse signal that makes the potential difference be a fourth potential difference greater than the third potential difference in a state in which the developing member is positioned in the contacting position.

8. The image forming apparatus according to claim 7, wherein the fourth voltage is a negative polarity and the controller controls so that an absolute value of the fourth voltage increases as a low duty ratio of the fourth pulse signal increases.

9. The image forming apparatus according to claim 7, further comprising:

a toner container configured to accommodate the toner, a supplying roller configured to supply the toner accommodated in the toner container to the developing member, and a blade configured to level the toner supplied to the developing member by the supplying roller, wherein the first contacting member is the blade and the second contacting member is the supplying roller.

10. The image forming apparatus according to claim 7, further comprising:

a toner container configured to accommodate the toner, a supplying roller configured to supply the toner accommodated in the toner container to the developing member, and a blade configured to level the toner supplied to the developing member by the supplying roller, wherein the first contacting member is the supplying roller and the second contacting member is the blade.

11. The image forming apparatus according to claim 4, wherein the controller controls the third power source by outputting the third pulse signal, and wherein the third voltage is a negative polarity and the controller controls so that an absolute value of the third voltage increases as a low duty ratio of the third pulse signal increases.

12. The image forming apparatus according to claim 2, further comprising a detector configured to detect a current flowing through the charging member, wherein the controller controls so that the developing member enters the separating state when the detector detects the current flowing through the charging member.

13. The image forming apparatus according to claim 1, further comprising:

a charging member configured to charge the photosensitive member; and a transferring member configured to transfer the toner image formed on the photosensitive member, wherein the first power source is configured to apply the first voltage to the transferring member.

14. The image forming apparatus according to claim 1, further comprising a contacting/separating portion configured to switch the developing member to the contacting position or the separating position.

* * * * *